(12) United States Patent
Krishnan

(10) Patent No.: US 10,616,583 B2
(45) Date of Patent: Apr. 7, 2020

(54) ENCODING/DECODING DIGITAL FRAMES BY DOWN-SAMPLING/UP-SAMPLING WITH ENHANCEMENT INFORMATION

(71) Applicant: Sony Interactive Entertainment Inc., Tokyo (JP)

(72) Inventor: Rathish Krishnan, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/199,686

(22) Filed: Jun. 30, 2016

(65) Prior Publication Data
US 2018/0007362 A1 Jan. 4, 2018

(51) Int. Cl.
| | |
|---|---|
| *H04N 19/132* | (2014.01) |
| *H04N 19/124* | (2014.01) |
| *H04N 19/107* | (2014.01) |
| *H04L 29/06* | (2006.01) |
| *H04N 19/19* | (2014.01) |
| *H04N 19/176* | (2014.01) |
| *H04N 19/61* | (2014.01) |

(Continued)

(52) U.S. Cl.
CPC ........ *H04N 19/132* (2014.11); *H04L 65/602* (2013.01); *H04L 65/607* (2013.01); *H04N 19/107* (2014.11); *H04N 19/124* (2014.11); *H04N 19/146* (2014.11); *H04N 19/159* (2014.11); *H04N 19/172* (2014.11); *H04N 19/176* (2014.11); *H04N 19/188* (2014.11); *H04N 19/19* (2014.11); *H04N 19/33* (2014.11); *H04N 19/61* (2014.11); *H04N 19/70* (2014.11); *H04N 19/147* (2014.11); *H04N 19/149* (2014.11); *H04N 19/523* (2014.11)

(58) Field of Classification Search
None
See application file for complete search history.

(56) References Cited

U.S. PATENT DOCUMENTS

| | | | |
|---|---|---|---|
| 5,878,172 A | 3/1999 | Go | |
| 6,618,443 B1 | 9/2003 | Kim et al. | |

(Continued)

FOREIGN PATENT DOCUMENTS

| | | |
|---|---|---|
| JP | 2014168150 A | 9/2014 |
| JP | 2015525008 A | 8/2015 |

OTHER PUBLICATIONS

International Search Report and Written Opinion dated Sep. 15, 2018 for International Patent Application No. PCT/US2017/040071.

(Continued)

*Primary Examiner* — Michael J Hess
(74) *Attorney, Agent, or Firm* — JDI Patent; Joshua Isenberg; Robert Pullman

(57) ABSTRACT

Input digital frames may be down-sampled to create one or more base frames characterized by a lower resolution than the input digital frames. Enhancement information corresponding to a difference between pixel values for the one or more input digital frames and corresponding pixel values of up-sampled versions of the one or more base frames is then created. The one base frames are encoded to form a set of base data and the enhancement information is encoded to form a set of enhancement data. The base data and enhancement data may then be transmitted over a network or stored in a memory.

78 Claims, 10 Drawing Sheets

(51) Int. Cl.
*H04N 19/146* (2014.01)
*H04N 19/159* (2014.01)
*H04N 19/172* (2014.01)
*H04N 19/169* (2014.01)
*H04N 19/33* (2014.01)
*H04N 19/70* (2014.01)
*H04N 19/149* (2014.01)
*H04N 19/147* (2014.01)
*H04N 19/523* (2014.01)

(56) References Cited

U.S. PATENT DOCUMENTS

| | | |
|---|---|---|
| 7,929,608 B2 | 4/2011 | Krishnan |
| 8,077,769 B2 | 12/2011 | Krishnan |
| 8,184,699 B2 | 5/2012 | Krishnan |
| 8,218,641 B2 | 7/2012 | Wang |
| 8,379,718 B2 | 2/2013 | Wang et al. |
| 8,711,933 B2 | 4/2014 | Lee |
| 8,780,976 B1 | 7/2014 | Jia |
| 8,848,799 B2 | 9/2014 | Krishnan et al. |
| 8,879,623 B2 | 11/2014 | Lee |
| 9,247,248 B2 | 1/2016 | Wang et al. |
| 2006/0222083 A1* | 10/2006 | Klein Gunnewiek ........ H03H 17/0276 375/240.29 |
| 2007/0206680 A1 | 9/2007 | Bourge et al. |
| 2007/0237224 A1 | 10/2007 | Krishnan |
| 2007/0237235 A1 | 10/2007 | Krishnan |
| 2011/0051811 A1 | 3/2011 | Wang et al. |
| 2011/0051813 A1 | 3/2011 | Krishnan et al. |
| 2011/0158317 A1 | 6/2011 | Krishnan |
| 2013/0003833 A1* | 1/2013 | Jang .......... H04N 19/105 375/240.12 |
| 2013/0156103 A1 | 6/2013 | Wang et al. |
| 2013/0208792 A1 | 8/2013 | He et al. |
| 2014/0087877 A1 | 3/2014 | Krishnan |
| 2014/0348222 A1* | 11/2014 | Hsiang .......... H04N 19/176 375/240.02 |
| 2015/0103899 A1* | 4/2015 | Le Leannec .......... H04N 19/30 375/240.12 |
| 2015/0189298 A1* | 7/2015 | Ye .......... H04N 19/196 375/240.02 |
| 2015/0201204 A1* | 7/2015 | Chen .......... H04N 19/33 375/240.02 |
| 2015/0245063 A1* | 8/2015 | Rusanovskyy ...... H04N 19/597 375/240.12 |
| 2015/0256856 A1* | 9/2015 | Tsukuba .......... H04N 19/70 375/240.25 |
| 2015/0296211 A1* | 10/2015 | Chuang .......... H04N 19/187 375/240.12 |
| 2015/0334416 A1 | 11/2015 | Holcomb et al. |
| 2015/0341657 A1* | 11/2015 | Onno .......... H04N 19/70 375/240.16 |
| 2016/0012855 A1 | 1/2016 | Krishnan |
| 2016/0088299 A1 | 3/2016 | Lee |
| 2016/0241866 A1* | 8/2016 | Kang .......... H04N 19/30 |
| 2016/0249069 A1* | 8/2016 | Ryu .......... H04N 19/895 |
| 2017/0155924 A1* | 6/2017 | Gokhale .......... H04N 19/159 |

OTHER PUBLICATIONS

Notification of Reasons for Refusal dated Jan. 7, 2020 for Japanese Patent Application No. 2018-568747.

* cited by examiner

ENCODING/DECODING DIGITAL FRAMES BY DOWN-SAMPLING/UP-SAMPLING WITH ENHANCEMENT INFORMATION

FIELD OF THE DISCLSOURE

Aspects of the present disclosure are related to encoding and decoding of digital data for streaming applications. In particular, the present disclosure is related to encoding the same video content at multiple resolutions.

BACKGROUND

Digital signal compression (sometimes referred to as video coding or video encoding) is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; AVC (H.264), and HEVC (H.265). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

Encoding the same video content at multiple resolutions is often necessary for video streaming over the network and for targeting different decoding hardware with different computational capabilities. For example, it is sometimes necessary to encode video with multiple resolutions due to bandwidth limitations and due to recent advances in the capabilities of video encoding and decoding hardware. With the growing popularity of 4K displays (picture width of 3840 to 4096 pixels), the demand for higher resolution video content has increased. The storage required for 4K video is much higher than for 1080p HD video. In some cases, storing both lower and higher resolution versions of the same video content might be necessary, e.g., for display on different hardware. Having both HD and 4K resolution video streams on a Blu-Ray disc could allow a lower powered video player to display the HD content and a more powerful video player to display the 4K content. However, due to storage limits on physical discs, it might not be possible to fit both resolutions on a single disc. One approach to addressing this issue is to produce both low resolution and high resolution discs for the same content. For video streaming over a network, the higher resolution video could be displayed when the bandwidth is high and the lower resolution could be displayed during network congestion. Fewer bits are needed to transmit lower resolution encoded video (e.g., 1080p HD video) than higher resolution (e.g., 4K) video.

Another approach is to encode the low resolution video and to up-sample it when presenting it on the higher resolution hardware. However, the video quality suffers when the up-sampled low resolution video is played on the high resolution hardware. Yet another approach is to store just the high resolution encoded video on disk. Unfortunately, low powered hardware might have to skip frames because it's not powerful enough to maintain the desired frame rate for the higher resolution video.

Having multiple discs increases the production costs, while storing only one resolution of the video on the disc does not allow the best experience for either the lower powered or the higher powered player. If only the lower resolution video is stored on the disc, the displayed picture will require up-sampling on higher resolution displays. The picture quality of up-sampled video content will be lower than that of content that is originally of higher resolution. If only the higher resolution video is stored on the disc, lower powered devices may not be able to display the content at the original frame rate, and may have to drop frames or lower the frame rate. This too results in a reduced user enjoyment.

While an extension to the Advanced Video Coding (AVC) standard known as Scalable Video Coding (SVC) allows efficient compression for multiple resolutions, the number of devices that support this extension is much lower compared to those that do not. As a result, the common approach to handling multiple resolutions is to resize the video content to multiple resolutions before encoding, and generating separate bitstreams for each resolution that could be decoded independently of each other.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Figure 1A:
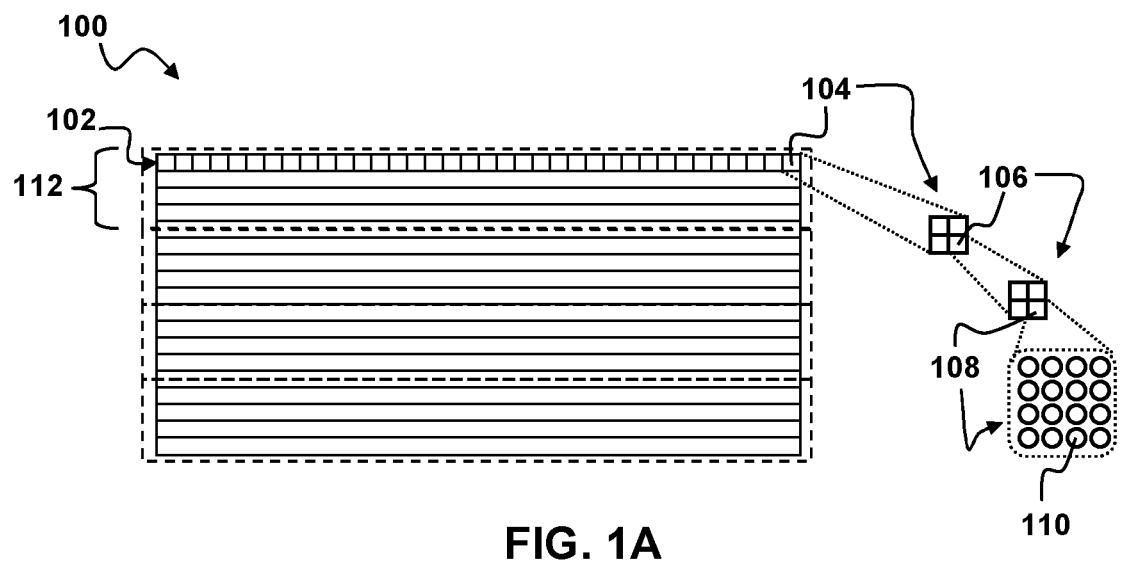
FIG. 1A is a schematic diagram illustrating one possible division of a streaming data picture within the context of aspects of the present disclosure.
Figure 1B:
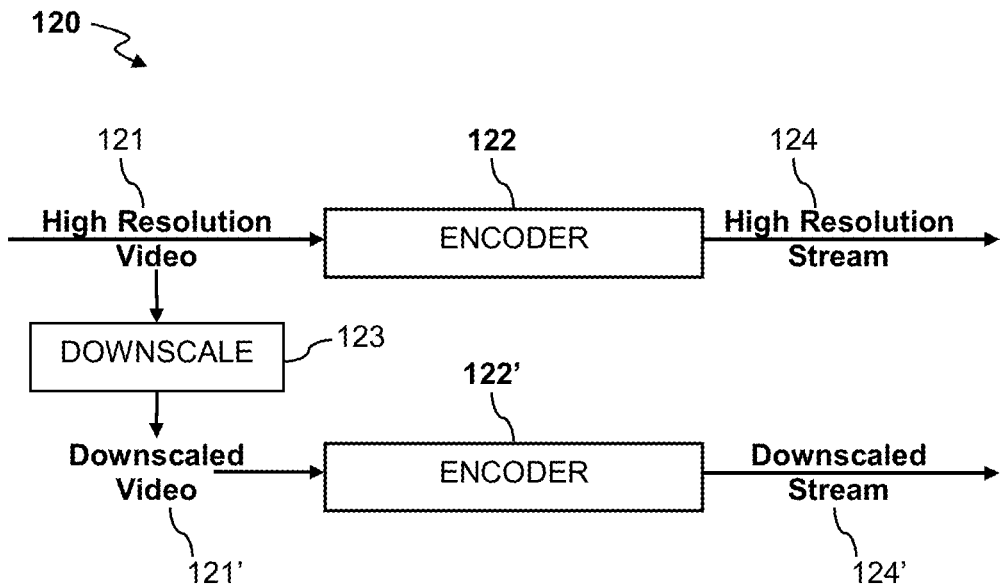
FIG. 1B is a flow diagram illustrating conventional multi-resolution picture encoding.

FIG. 1B illustrates an example of conventional encoding multi-resolution video 121. An encoder 122 encodes the high resolution video to generate a high resolution stream 124 of bits representing encoded high resolution video frames. To accommodate older hardware not configured for high resolution video or to reduce bandwidth required for transmission during bandwidth congestion, the high resolution video is down-sampled, as indicated at 123 and the resulting down-sampled video 121' is encoded, e.g., by another encoder 122' to generate a stream of bits 124' representing encoded down-sampled video frames.

Figure 1C:
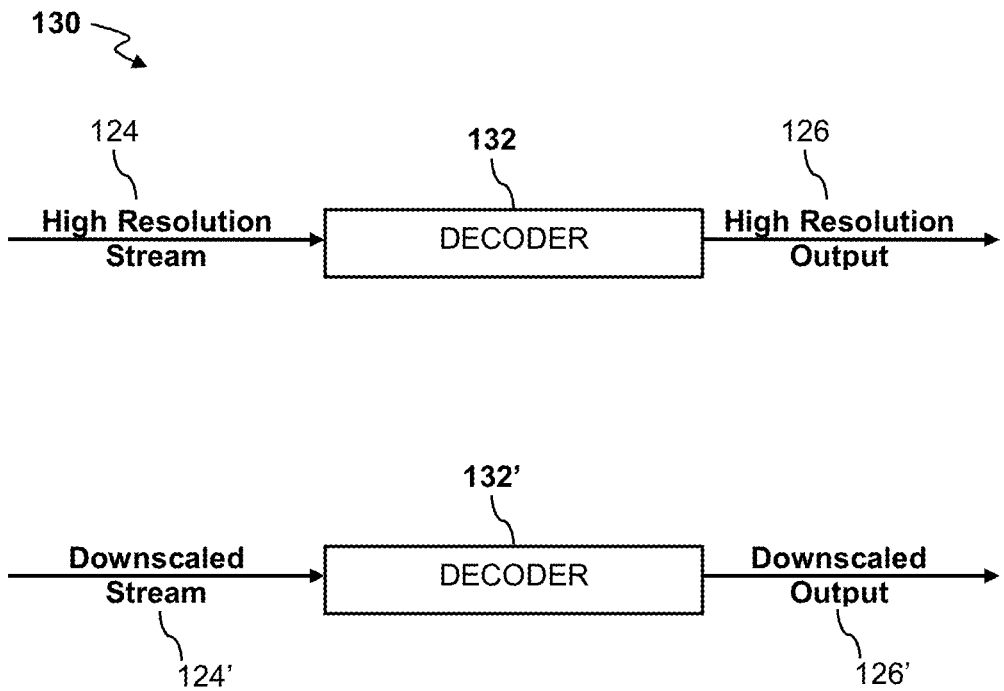
FIG. 1C is a flow diagram illustrating conventional multi-resolution picture decoding.

On the decoder side, illustrated in FIG. 1C, a decoder 132 receives the high resolution stream 124 and decodes it to generate high resolution output 126 in the form of decoded high resolution video frames. Devices not equipped to decode the high resolution stream may ignore the high resolution stream and receive and decode the down-sampled stream 124', e.g., using a different decoder 132'.

Aspects of the present disclosure allow for efficient video compression without utilizing extensions to a video coding standard. The approach described herein allows for high picture quality with lower bit usage compared to the existing method of encoding multiple resolutions of the same content as separate bitstreams. Instead of creating a separate bitstream at a higher resolution, the encoder creates an enhancement stream that uses fewer bits. The decoder creates output video for display by combining a lower resolution base stream and the enhancement stream. The extra processing required to generate the output video could be performed efficiently on a graphics processor unit (GPU). The proposed approach is particularly advantageous if the average time needed to generate a high-resolution frame using the proposed is not higher than the time needed to decode a frame using a separate high-resolution bitstream.

According to aspects of the present disclosure, the proposed approach uses a combination of up-sampling of low resolution video and enhancement information. When low resolution video is up-sampled to high resolution some sharpness is lost. As a result, the video looks blurred. "enhancement information" can be combined with up-sampled low resolution video to produce a high quality image for display. The edge enhancement data captures information that is lost when up-sampling low resolution video to high resolution. The edge enhancement information is related to pixel values that correspond to edges within an image. The combination of up-sampling with edge enhancement eliminates the need to store a separate higher resolution video bitstream, and instead only an enhancement stream needs to be stored, which requires fewer bits and therefore much less storage space. This approach is particularly advantageous if the amount of data required for the low resolution video plus edge enhancement information before encoding is less than or equal to the amount of data required for the high resolution video before encoding. Such situations may arise in embodiments wherein high resolution video is down-sampled to low resolution video, and edge enhancement data is created from the high resolution video data before down-sampling. In certain implementations, down-sampling may involve an integer down-sample, e.g., eliminating alternate pixels. An example of an integer down-sample may be down-sampling from 4K (2160P) to 1080P.

In some implementations, the enhancement information may be encoded in an existing video format that a decoder would recognize and an existing encoder would know how to encode. By way of example and not by way of limitation, the enhancement information may be encoded using existing AVC or High Efficiency Video Coding (HEVC) decoders found commonly in devices that support video playback and does not require devices to add support for extensions to the standard. This solution could also be used to reduce the CPU and GPU load for decoding high resolution video bitstreams in devices that include multiple decoders (e.g., both hardware and software-based decoders).

The enhancement stream need not be stored in a video format; however, doing so works quite well with existing hardware. In alternative implementations the edge enhancement information could be encoded, e.g., using JPEG compression or any other arithmetic coding standard.

Up-sampling in conjunction with enhancement information as described herein could also be applied to still images, e.g., where JPEG encoding or some other image compression standard is used to compress both the base and the enhancement information.

Raw video is represented by luminance (intensity) and chrominance (color) values. Many encoders use fewer bits to store the chrominance data so that more bits may be spent on luminance data, as the human eye is more sensitive to differences in luminance than chrominance.

In certain implementations, an enhancement information generation algorithm may analyze the images in video data to find edges within the image. Edge enhancement data may be determined by analyzing the result of comparing an up-sampled version of a low resolution base image to the corresponding original high resolution image and determining the difference between the images. Up-sampling the low resolution image may use a standard algorithm, e.g. bilinear (fastest and lowest quality) or bicubic (better quality but slower). In certain embodiments, this comparison may be performed by the GPU. In alternative embodiments, this comparison may be performed by a CPU. In some cases, there is no edge enhancement information for a frame because there is not a significant difference between the high resolution video and the up-sampled low resolution video. When such a scenario occurs in situations involving high resolution streaming, those frames for which there is not a significant difference could be encoded as original high resolution frames without edge enhancement information. In alternative embodiments, edge enhancement information may be determined as provided below and subsequently compared to a threshold; the result of such a comparison can then be used to determine whether or not to down-sample the frame before encoding.

By way of example, and not by way of limitation, the enhancement information may be generated by determining a difference in pixel values (e.g., chroma values or luma values or both) between the up-sampled low resolution image and the original high resolution image and adding a midpoint for pixel value (e.g., 128 for 8-bit). According to certain aspects of the present disclosure, the enhancement information may be created in such a way as to minimize the arithmetic difference between the input frame and an up-sampled version of the down-sampled frame. As used herein the term 'difference' refers to a difference in the mathematical sense, including but not limited to arithmetic difference (i.e., the result of a subtraction). Determining the difference may include other mathematical operations on the pixel values prior to subtraction, such as squaring, taking a square root, multiplying by a scaling factor. Determining the difference may also include mathematical operations on the result of a subtraction. For example, in some implementations negative values resulting from a subtraction may be set to zero, and any values that exceed the maximum value for the number of bits may be set to the maximum value (e.g., for 8-bit pixels, values greater than 255 would be set to 255). Additionally, the same number of bits could be utilized to represent each lower resolution pixel, but fewer bits could be used to represent the edge enhancement data, as a large number of bits might not be needed to represent a small difference. By way of example, and not by way of limitation, a calculated 16-bit difference may have a value reduced to an 8-bit representation. Other examples of generating edge enhancement information include feature and edge detection methods such as using the Sobel operator or Roberts cross operator.

In certain implementations, the difference in the luminance values may be determined without regard for chrominance information that is lost when the up-sampling of the low resolution video is carried out. This frees up computational and memory resources, as no additional chrominance data is saved during the utilization of such a process. This process also increases the efficiency of the encoding process, as computing the differences for the chrominance values is no longer required. By way of example, and not by way of limitation, the luminance information may be stored in the chrominance information in order to manipulate an encoder into encoding some of the luminance information as chrominance information while the rest of the luminance information remains luminance information. On the decoder side, the luminance information stored as chrominance information is moved back to the luminance information and the chrominance information is ignored. Alternatively embodiments allow for the encoding of the chrominance as a flat grey.

In certain alternative embodiments, a filtering stage is added to make the edge enhancement information more suitable for video compression, e.g., by removing noisy pixels. Noisy pixels are, for example, isolated pixels that are of a much different value than surrounding pixels.

In certain implementations, decoding performed on low resolution hardware may involve decoding the low resolution video and taking no action with the enhancement data. In alternative embodiments of the present invention, decoding performed on high resolution hardware may involve decoding the low resolution video and the enhancement data and performing the inverse of the comparison that generated the enhancement data to result in reconstituted high resolution video. The inverse comparison may be performed on either the GPU or the CPU. Up-sampling the data may use bilinear or bicubic according to the algorithm that was used to generate the edge enhancement information.

In alternative embodiments of the present invention, two decoders are utilized. A first decoder may decode low resolution video, and a second decoder may decode the edge enhancement data. In certain embodiments, a hardware decoder may be used for the video and a software decoder may be used for the enhancement data. In alternative embodiments, two instances of a software decoder or two hardware decoders may optionally be utilized. Furthermore, certain alternative embodiments may apply the encoding/decoding processes, methods, and devices described above with respect to audio data.

In other alternative implementations, only one decoder might be utilized. In such cases encoding may be implemented with only one encoder, and the enhancement data may be encoded into the same bitstream as the encoded base video data. The encoded base video data does not reference any frames containing the enhancement data, and can be decoded independently without decoding the enhancement data completely. By way of example, the slice headers could be used to determine if data being decoded corresponds to the base video or the enhancement video, and if the enhancement data is not required, the rest of decoding may be skipped for that frame. In lower powered hardware, only the base video pictures are decoded. In higher powered hardware, all frames are decoded, and the final high resolution frame is reconstructed from the decoded base video and enhancement data.

The above-described processes, methods, and devices may alternatively be used to compress high resolution video for storage, as down-sampling high resolution video and storing the down-sampled video with corresponding edge enhancement data may require less storage space than simply storing the high resolution video.

In certain implementations, the edge enhancement algorithm may be used to determine if any frame has enough detail to be sent at high resolution (e.g., 4K resolution) and, if so, the frame may be encoded at high resolution without down-sampling. By way of example, and not by way of limitation, determining whether a frame has enough detail to be sent at high resolution may use metrics such as variance or a count of the total number of pixels that are not equal to some reference value, e.g., 128, and use thresholds established from empirical data to determine if the enhancement information is significant. If it is determined that the frame does not have enough detail to be sent at 4K resolution, the frame may be down-scaled to a lower resolution (e.g., 1080P), and encoded as a restructured frame containing low resolution pixels surrounded by pixels of uniform chroma and luma values, e.g., flat grey, along with parameters to indicate the section of the frame that contains the lower resolution data. On the decoder side, these restructured frames may be decoded by using the parameters to extract the down-scaled frame and then up-sampling the extracted down-scaled frame. Alternatively, if it is determined that sending the frame at high resolution (e.g., 4K resolution) is inefficient, the frame may be down-scaled to a lower resolution (e.g., 1080P), followed by generation of enhancement information and encoding of base frames and enhancement information. In such implementations, a decoder can up-sample the low resolution frames and combine them with enhancement information and handle the 4K frames normally. By selectively sending some frames as low resolution, these embodiments are capable of reducing the bit stream size.

Before describing up-sampling with edge enhancement in accordance with aspects of the present disclosure, it is useful to understand how digital pictures, e.g., video pictures are encoded for streaming applications. Furthermore, it is useful to understand how encoded streaming digital picture data is decoded, since the manner in which a picture or portion of a picture is encoded affects how it is to be decoded.

By way of example, and not by way of limitation, as shown in FIG. 1A, a single picture 100 (e.g., a digital video frame) may be broken down into one or more sections. As used herein, the term "section" can refer to a group of one or more pixels within the picture 100. A section can range from a single pixel within the picture, up to the whole picture. Non-limiting examples of sections include slices (e.g., macroblock rows) 102, macroblocks 104, sub-macroblocks 106, blocks 108 and individual pixels 110. Other examples include Coding Tree Blocks (CTB) and other section types that are specific to the HEVC (H.265) coding standard. As illustrated in FIG. 1A, each slice 102 contains one or more rows of macroblocks 104 or portions of one or more such rows. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each 16×16 pixel macroblock 104 may be broken down into four 8×8 pixel sub-macroblocks 106. Each sub-macroblock may be broken down into four blocks 108 and each block may contain a four by four arrangement of sixteen pixels 110.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors or other light emitting elements used to illuminate the pixels in the display combined with the persistence of vision results in the two fields being perceived as a continuous image. For certain display devices, such as liquid crystal displays, it may be necessary to interlace the two fields into a single picture before being displayed. Streaming data representing encoded images typically includes information indicating whether the image is a field or a frame. Such information may be included in a header to the image.

Modern video coder/decoders (codecs), such as MPEG2, MPEG4 and H.264 generally encode video frames as one of three basic types known as Intra-Frames, Predictive Frames and Bipredicitve Frames, which are typically referred to as I-frames, P-frames and B-frames respectively.

An I-frame is a picture coded without reference to any picture except itself. I-frames are used for random access and are used as references for the decoding of other P-frames or B-frames. I-frames may be generated by an encoder to create random access points (to allow a decoder to start decoding properly from scratch at a given picture location). I-frames may be generated when differentiating image details prohibit generation of effective P or B frames. Because an I-frame contains a complete picture, I-frames typically require more bits to encode than P-frames or B-frames. Video frames are often encoded as I-frames when a scene change is detected in the input video.

P-frames require the prior decoding of some other picture(s) in order to be decoded. P-frames typically require fewer bits for encoding than I-frames. A P-frame contains encoded information regarding differences relative to a previous I-frame in decoding order. A P-frame typically references the preceding I-frame in a Group of Pictures (GoP). P-frames may contain both image data and motion vector displacements and combinations of the two. In some standard codecs (such as MPEG-2), P-frames use only one previously-decoded picture as a reference during decoding, and require that picture to also precede the P-frame in display order. In H.264, P-frames can use multiple previously-decoded pictures as references during decoding, and can have any arbitrary display-order relationship relative to the picture(s) used for its prediction.

B-frames require the prior decoding of either an I-frame or a P-frame in order to be decoded. Like P-frames, B-frames may contain both image data and motion vector displacements and/or combinations of the two. B-frames may include some prediction modes that form a prediction of a motion region (e.g., a segment of a frame such as a macroblock or a smaller area) by averaging the predictions obtained using two different previously-decoded reference regions. In some codecs (such as MPEG-2), B-frames are never used as references for the prediction of other pictures. As a result, a lower quality encoding (resulting in the use of fewer bits than would otherwise be used) can be used for such B pictures because the loss of detail will not harm the prediction quality for subsequent pictures. In other codecs, such as H.264, B-frames may or may not be used as references for the decoding of other pictures (at the discretion of the encoder). In H.264, there are two types of B-frame, a reference B-frame and non-reference B-frame. A reference B-frame can be used as a reference frame for B-frame coding and a non-reference B-frame cannot. Some codecs (such as MPEG-2), use exactly two previously-decoded pictures as references during decoding, and require one of those pictures to precede the B-frame picture in display order and the other one to follow it. In other codecs, such as H.264, a B-frame can use one, two, or more than two previously-decoded pictures as references during decoding, and can have any arbitrary display-order relationship relative to the picture(s) used for its prediction. B-frames typically require fewer bits for encoding than either I-frames or P-frames.

As used herein, the terms I-frame, B-frame and P-frame may be applied to any streaming data units that have similar properties to I-frames, B-frames and P-frames, e.g., as described above with respect to the context of streaming video.

Figure 2A:
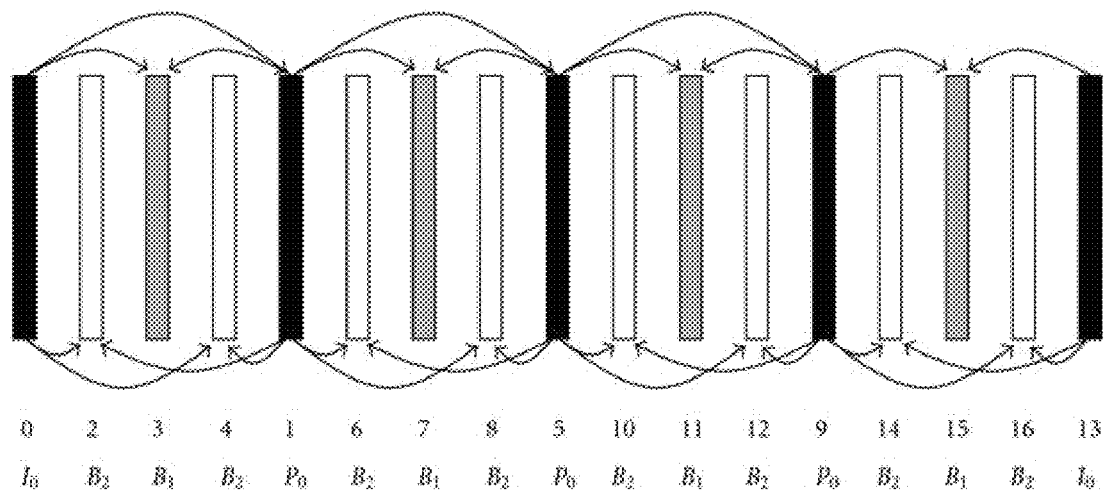
FIG. 2A is a schematic diagram illustrating a configuration of a stream of encoded frames including base frames and frames containing enhancement data in accordance with aspects of the present disclosure.

By way of example and not by way of limitation, a common bitstream containing encoded base frames and encoded enhancement data may be configured as shown in FIG. 2A. In this example, base frames are coded as I-frames 0, 13 or P-frames 1, 5, 9. The frames for the enhancement data are encoded as B-frames 2, 3, 4, 6, 7, 8, 10, 11, 12, 14, 15, 16. The enhancement frames can use the base frames as reference, as indicated by the arrows, but not vice versa. In FIG. 2A, the I-frames 0, 13 may correspond to the base frame data and the rest of the frames may contain encoded enhancement data. In this example, all of the B-frames are non-reference frames.

In an alternative configuration (not shown) only the I-frames 0, 13 would correspond to the base frame data, while the P-frames 1, 5, 9 and B-frames 2, 3, 0, 7, 8, 10, 11, 12, 14, 15, 16 would correspond to the enhancement data. In such an implementation, the P-frames may be used as reference frames for the B-frames.

Figure 2B:
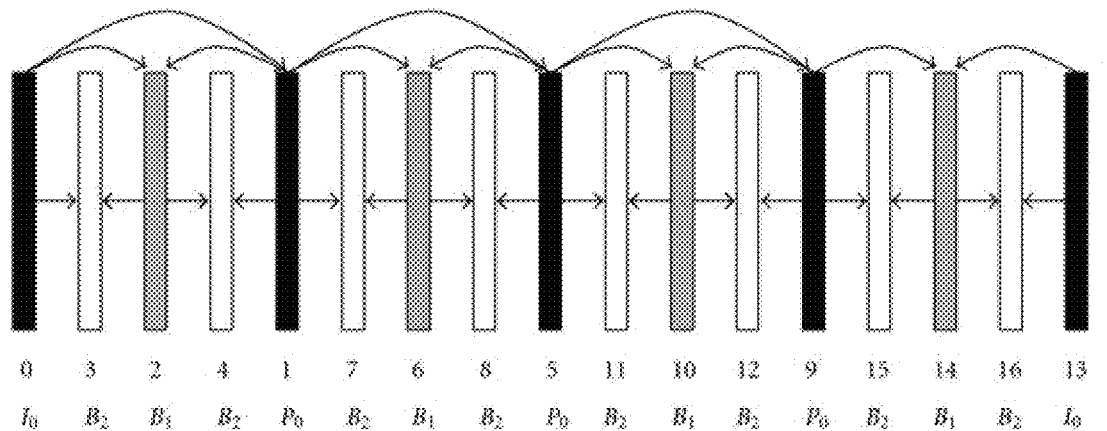
FIG. 2B is a schematic diagram illustrating an alternative configuration of a stream of encoded frames including base frames and frames containing enhancement data in accordance with aspects of the present disclosure.

FIG. 2B illustrates an alternative configuration for a common bitstream in accordance with aspects of the present disclosure. In this example the bitstream is created using a hierarchical-B structure in which certain B-frames 2, 6, 10, 14 are used as reference for other B-frames. In particular, frame 2 may be used as a reference for frames 3 and 4, frame 6 may be used as a reference for frames 7 and 8, frame 10 may be used as a reference for frames 11 and 12 and frame 14 may be used as a reference for frames 15 and 16. In this example B-frames can be skipped without affecting the decoding of the base frames 0, 1, 5, 9, 13.

Figure 2C:
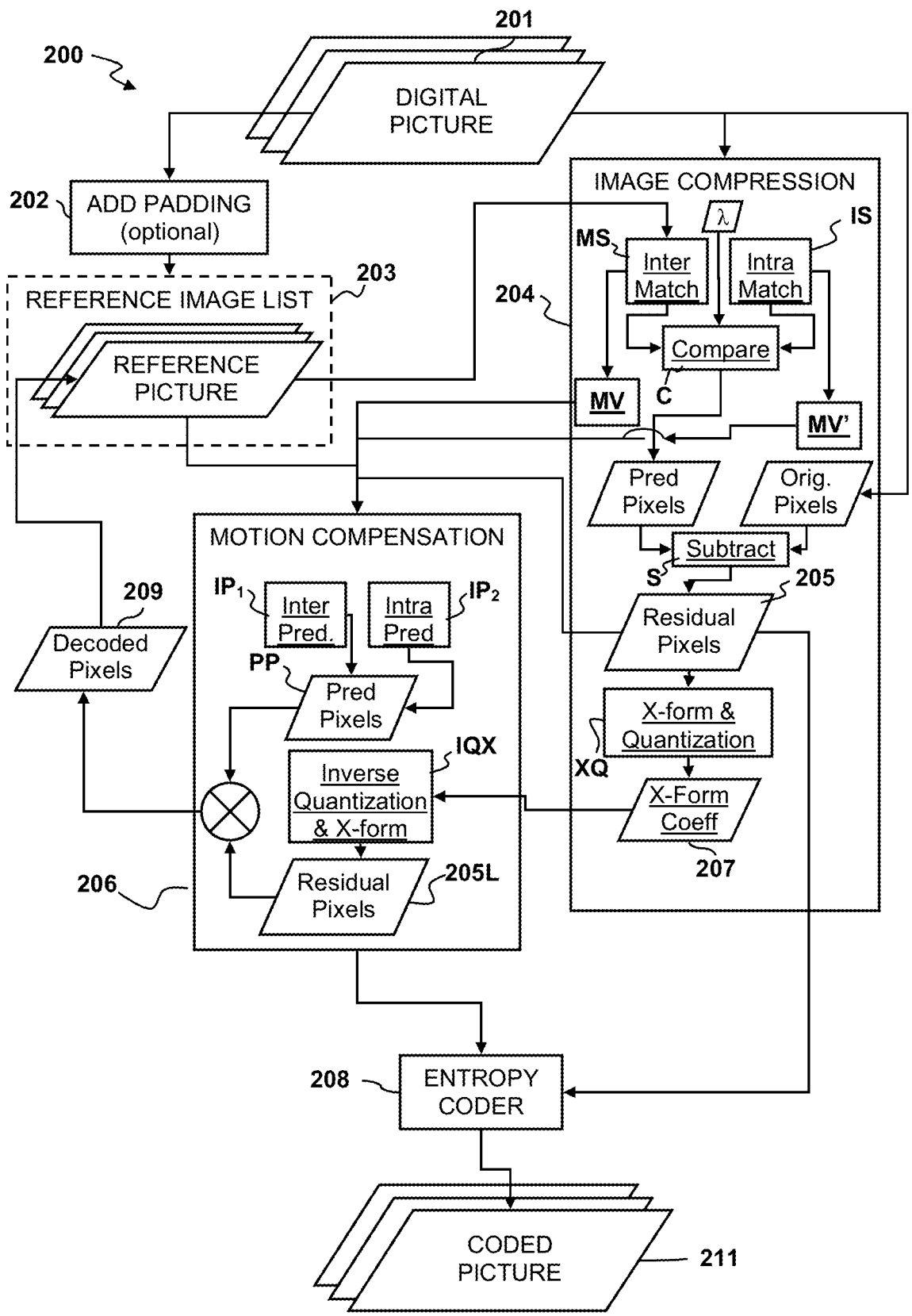
FIG. 2C is a flow diagram illustrating conventional digital picture encoding that may be used in conjunction with aspects of the present disclosure.

By way of example, and not by way of limitation, digital pictures may be encoded according to a generalized method 200 as illustrated in FIG. 2C. The encoder receives a plurality of digital images 201 and encodes each image. Encoding of the digital picture 201 may proceed on a section-by-section basis. The encoding process for each section may optionally involve padding 202, image compression 204 and motion compensation 206. To facilitate a common process flow for both intra-coded and inter-coded pictures, all un-decoded pixels within a currently processing picture 201 may be padded with temporary pixel values to produce a padded picture, as indicated at 202. The padding may proceed, e.g., as described above in U.S. Pat. No. 8,711,933, which is incorporated herein by reference. The padded picture may be added to a list of reference pictures 203 stored in a buffer. Padding the picture at 202 facilitates the use of a currently-processing picture as a reference picture in subsequent processing during image compression 204 and motion compensation 206. Such padding is described in detail in commonly-assigned U.S. Pat. No. 8,218,641, which is incorporated herein by reference.

As used herein, image compression refers to the application of data compression to digital images. The objective of the image compression 204 is to reduce redundancy of the image data for a give image 201 in order to be able to store or transmit the data for that image in an efficient form of compressed data. The image compression 204 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 201 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 204 may include region of interest coding in which certain parts of the image 201 are encoded with higher quality than others. This can be combined with scalability, which involves encoding certain parts of an image first and others later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 204 the encoder may search for the best way to compress a block of pixels. The encoder can search all of the reference pictures in the reference picture list 203, including the currently padded picture, for a good match. If the current picture (or subsection) is coded as an intra picture, (or subsection) only the padded picture is available in the reference list. The image compression at 204 produces a motion vector MV and transform coefficients 207 that are subsequently used along with one or more of the reference pictures (including the padded picture) during motion compensation at 206.

The image compression 204 generally includes a motion search MS for a best inter prediction match, an intra search IS for a best intra prediction match, an inter/intra comparison C to decide whether the current macroblock is inter-coded or intra-coded, a subtraction S of the original input pixels from the section being encoded with best match predicted pixels to calculate lossless residual pixels 205. The residual pixels then undergo a transform and quantization XQ to produce transform coefficients 207. The transform is typically based on a Fourier transform, such as a discrete cosine transform (DCT).

The transform outputs a set of coefficients, each of which is a weighting value for a standard basis pattern. When combined, the weighted basis patterns re-create the block of residual samples. The output of the transform, a block of transform coefficients, is quantized, i.e. each coefficient is divided by an integer value. Quantization reduces the precision of the transform coefficients according to a quantization parameter (QP). Typically, the result is a block in which most or all of the coefficients are zero, with a few non-zero coefficients. Setting QP to a high value means that more coefficients are set to zero, resulting in high compression at the expense of poor decoded image quality. For a low QP value, more non-zero coefficients remain after quantization, resulting in better decoded image quality but lower compression. Conversely, for a high QP value, fewer non-zero coefficients remain after quantization, resulting in higher image compression but lower image quality.

The inter/intra comparison C, also referred to as a mode decision uses a parameter known as a Lagrange multiplier $\lambda$ that is related to QP. Basically, a cost function J is computed using a value of $\lambda$ determined from the value of QP. The encoding mode is determined based on whether the computed cost function J for inter mode coding is above or below a computed cost for intra mode coding. By way of example, the H.264/AVC codec supports a cost function $J_H$, which should be minimized by computing the actual bit consumption R for encoding the overhead (e.g., motion vectors, types) of the section and the reconstruction distortion D (measured, e.g., as a sum of absolute differences, SAD between the original and reconstructed sections). In such a case, the cost function $J_H$ is computed according to $$J_H = D + \lambda \cdot R.$$

In alternative implementations, the distortion D may be calculated differently. There are many ways to represent the distortion, for example, sum of squared differences (SSD), sum of absolute transformed differences (SATD), mean absolute difference (MAD), and the like. Those skilled in the art will recognize that for different distortion measures, the cost function has to be modified or re-tuned accordingly.

Under some circumstances, an improper encoding mode decision can trigger an unnecessary IDR or I-frame insertion. Consider an example of steaming video during online video gaming. The encoder tries to meet a target bit rate for the video stream that is generated by a game application. The target bit rate is related to the number of bits per frame. If the game is paused, the video is essentially a stream of still frames. For a still frame, the QP is low in order to meet the target bits for the frame in rate distortion optimization process. When QP is low, the mode decision selects intra coding for most sections (e.g., macroblocks) in a still frame. If the number of intra-coded sections in a frame is above a threshold the codec triggers a scene-change detection and the next frame is coded as an intra frame with extremely low QP, which requires a large number of bits to encode. This is due to the fact that extremely low values of QP (e.g., QP=1, 2) implies nearly lossless coding in this case. By way of example, and not by way of limitation, the threshold for triggering scene change detection may be about 60-80% intra MB in a frame. A sequence of still frames causes in a sequence of scene change detections even though basically the same frame is being repeated. The sequence of intra-frames can cause large and frequent spikes of bit rate usage in a bandwidth-limited communication channel.

Normally relationship between $\lambda$ and QP is fixed by the codec and is the same for all pictures. According to aspects of the present disclosure, the relationship between $\lambda$ and QP can be adjusted from picture to picture depending on the number of bits per section in a picture.

According to aspects of the present disclosure, the relation between $\lambda$ and QP can be adapted based on the number of bits per section so that the encoding mode decision can be configured in a way that reduces the likelihood of unnecessary IDR or I-frame insertion.

According to aspects of the present disclosure, the relationship between $\lambda$ and QP may be selectively adjusted during encoding, e.g., at the beginning of encoding of a video stream or the beginning of each video frame in a stream in a way that makes it more likely for the section encoding mode decision to result in an "inter" coding decision instead of an "intra" coding mode.

In some implementations it is even possible to change the $\lambda$ versus QP relationship for each section if there are different size sections in a frame, e.g., as is possible in H.265. This could be beneficial, e.g., in two-pass encoding use cases since the first pass would provide more insight about the content of the picture sections so that better coding mode decisions can be made.

By way of example, and not by way of limitation, adjustment to the relationship between $\lambda$ and QP may depend on the number of bits in a section (NBS), which generally depends on the target bitrate (e.g., in bits per second), the frame rate (e.g., in frames per second), and the number of sections in a frame. The number of bits in a section NBS can be calculated by dividing the target bitrate BR by the product of the frame rate FR and the number of sections per frame NSF. By way of example, and not by way of limitation, this can be expressed as:

$$NBS = BR/(FR \cdot NSF)$$

More generally, the number of bits per section (NBS) may be more broadly expressed as NBS=(BPF)/(NSF), where BPF is the target number of bits per frame.

This broadened expression allows for the possibility that the value of NBS could be different from frame to frame, depending, e.g., on the target bits allocated by the underlying rate control scheme. In the case of a fixed target number of bits for each frame BPF becomes BR/FR.

The number of sections (e.g., MB) per frame depends on the resolution. The change to the table can be triggered by a combination of resolution, frame rate, and bit rate. E.g., a table change would be triggered for a frame having 960 by 540 resolution, a frame rate of 30 fps, and a target rate of 8-10 Mbps or higher. For a given bitrate and frame rate a table change is less likely to be triggered if the resolution increases. For a given bitrate and resolution a table change is less likely to be triggered if the frame rate increases. For a given frame rate and resolution a table change is less likely to be triggered if the bitrate decreases.

The relationship between $\lambda$ and QP is typically nonlinear. Generally, when QP is high $\lambda$ is high and when QP is low $\lambda$ is low. Examples of relationships between $\lambda$ and QP are described in U.S. patent application Ser. No. 14/493,238 filed Sep. 22, 2014 and published as U.S. Patent Application Publication Number 2016/0088299, the entire contents of which are been incorporated herein by reference.

The QP value can be adjusted depending on the target bitrate. Since QP controls bit usage in encoding, many encoding programs utilize a rate controller that adjusts QP in order to achieve a desired bitrate. The encoder receives uncompressed source data (e.g., an input video) and produces compressed output. The video coding method typically uses a QP value that affects the bit usage for encoding a video section and therefore affects the bitrate. Generally, lower bit usage results in a higher bitrate. A rate controller determines a QP value based on a demanded bitrate, which may be specified by an external application. The encoder uses the QP value determined by the rate controller and determines the actual resulting bit usage and bit rate. The rate controller can use the actual bit rate to adjust the QP value in a feedback loop.

A relationship between the bitrate and the value of the QP depends partly on the complexity of the image being. The bitrate versus QP relationship can be expressed in terms of a set of curves with different curves for different levels of complexity. The heart of the algorithm implemented by the rate controller is a quantitative model describing a relationship between QP, actual bitrate and some measure of complexity. The relevant bitrate and complexity are generally associated only with the differences between source pixels and predicted pixels (often referred to as residuals) because the quantization parameter QP can only influence the detail of information carried in the transformed residuals.

Complexity generally refers to amount of spatial variation within a picture or part of the picture. On a local level, e.g., block or macroblock level, the spatial variation may be measured by the variance of the pixel values within the relevant section. However, for a video sequence, complexity may also relate to the temporal variation of a scene of a sequence of images. For example, a video sequence consists of one object having substantial spatial variation that translates slowly across the field of view, may not require very many bits because temporal prediction can easily capture the motion using a single reference picture and a series of motion vectors. Although it is difficult to define an inclusive video complexity metric that is also easy to calculate, the Mean Average Difference (MAD) of the prediction error (difference between source pixel value and predicted pixel value) is often used for this purpose.

It is noted that the quantization parameter QP may be determined from multiple factors including, but not limited to the picture type of the source picture, a complexity of the source picture, an estimated target number of bits and an underlying rate distortion model. For example, QP may be determined on a section-by-section basis using a variation for a section of the currently encoding picture, e.g., a section (e.g., MB) variance. Alternatively, QP for a currently encoding section may be determined using an actual bit count for encoding a co-located section (e.g., MB) in a previous frame. Examples of such QP level calculations are described, e.g., in commonly assigned U.S. Patent Application Publication No. 2011/0051806, now U.S. Pat. No. 8,879,623 to Hung-Ju Lee, which is incorporated herein by reference.

Motion search and prediction depend on the type of picture being encoded. Referring again to FIG. 2C, if an intra picture is to be coded, the motion search MS and inter/intra comparison C are turned off. However, in embodiments of the present invention, since the padded picture is available as a reference, these functions are not turned off. Consequently, the image compression 204 is the same for intra-coded pictures and inter-coded pictures.

The motion search MS may generate a motion vector MV by searching the picture 201 for a best matching block or macroblock for motion compensation as is normally done for an inter-coded picture. If the current picture 201 is an intra-coded picture, by contrast, existing codecs typically do not allow prediction across pictures. Instead all motion compensation is normally turned off for an intra picture (e.g., I-frame) and the picture coded by generating transform coefficients and performing pixel prediction. In some implementations, however, an intra picture may be used to do inter prediction by matching a section in the current picture to another offset section within that same picture. The offset between the two sections may be coded as a motion vector MV' that can be used that for motion compensation at 206. By way of example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain existing codecs have functions that can convert an offset between two blocks or macroblocks into a motion vector, which can be followed to do motion compensation at 206. However, these functions are conventionally turned off for encoding of intra pictures. In embodiments of the present invention, the codec may be instructed not to turn off such "inter" picture functions for encoding of intra pictures.

As used herein, motion compensation refers to a technique for describing a picture in terms of the transformation of a reference image to a currently processing image. In general, the motion compensation 206 acts as a local decoder within the encoder implementing the encoding process 200. Specifically, the motion compensation 206 includes inter prediction IP1 and (optionally) intra prediction IP2 to get predicted pixels PP using the motion vector MV or MV' from the image compression 204 and reference pixels from a picture in the reference list. Inverse quantization and inverse transformation IQX using the transform coefficients 207 from the image compression 204 produce lossy residual pixels 205L which are added to the predicted pixels PP to generate decoded pixels 209. The decoded pixels 209 are inserted into the reference picture and are available for use in image compression 204 and motion compensation 206 for a subsequent section of the currently-processing picture 201. After the decoded pixels have been inserted, un-decoded pixels in the reference picture may undergo padding 202.

In some encoder implementations, if the current picture is intra coded, the inter-prediction portions of motion compensation 206 are turned off because there are no other pictures that can be used for motion compensation. Alternatively, motion compensation may be performed on any picture 201 independent of whether a particular picture is to be inter-coded or intra-coded. In some implementations, the encoder implementing may be modified to add the padded picture to the reference picture list 203 and the inter-prediction portions of the motion compensation 206 are not turned off, even if the currently processing image is to be intra coded. As a result, the process flow for both inter coded sections and intra coded sections is the same during motion compensation 206. The only major difference is the selection of the reference picture to be used for encoding. It is noted that in some implementations, motion-compensation need not be performed on all pictures, and padded pictures need not be added to the reference picture list.

By way of example, and not by way of limitation, in one type of motion compensation, known as block motion compensation (BMC), each image may be partitioned into blocks of pixels (e.g. macroblocks of 16×16 pixels). Each block is predicted from a block of equal size in the reference frame. The blocks are not transformed in any way apart from being shifted to the position of the predicted block. This shift is represented by a motion vector MV. To exploit the redundancy between neighboring block vectors, (e.g. for a single moving object covered by multiple blocks) it is common to encode only the difference between a current and previous motion vector in a bit-stream. The result of this differencing process is mathematically equivalent to a global motion compensation capable of panning. Further down the encoding pipeline, the method 200 may optionally use entropy coding 208 to take advantage of the resulting statistical distribution of the motion vectors around the zero vector to reduce the output size.

It is possible to shift a block by a non-integer number of pixels, which is called sub-pixel precision. The in-between pixels are generated by interpolating neighboring pixels. Commonly, half-pixel or quarter pixel precision is used. The computational expense of sub-pixel precision is much higher due to the extra processing required for interpolation and on the encoder side, a much greater number of potential source blocks to be evaluated.

Block motion compensation divides up a currently encoding image into non-overlapping blocks, and computes a motion compensation vector that indicates where those blocks come from in a reference image. The reference blocks typically overlap in the source frame. Some video compression algorithms assemble the current image out of pieces of several different reference images in the reference image list 203.

The result of the image compression 204 and motion compensation 206 and (optionally) entropy coding 208 is a set of data 211 referred to for convenience as a coded picture. The motion vector MV, (and/or intra prediction mode motion vector MV') and transform coefficients 207 may be included in the coded picture 211. Once a digital picture or other form of streaming data has been encoded, the encoded data may be transmitted and then decoded.

Figure 3:
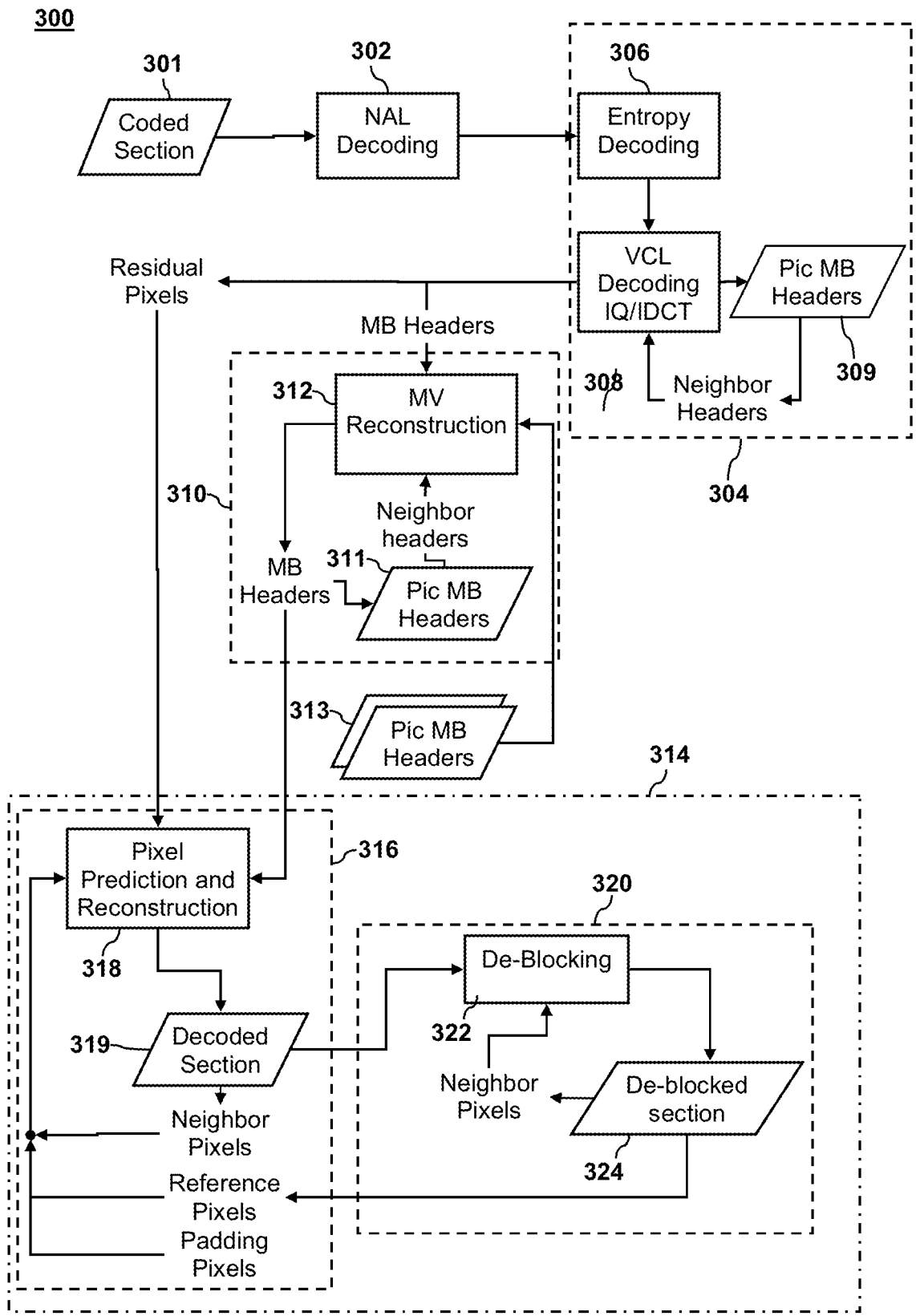
FIG. 3 is a flow diagram illustrating an example of a possible process flow in streaming data decoding that may be used in conjunction with aspects of the present disclosure.

FIG. 3 illustrates an example of a possible process flow in a method 300 for decoding of streaming data 301 that may be used in conjunction with aspects of the present disclosure. This particular example shows the process flow for video decoding, e.g., using the AVC (H.264) standard. The coded streaming data 301 may initially be stored in a buffer. Where coded streaming data 301 (e.g., a video data bitstream) has been transferred over a network, e.g., the Internet, the data 301 may initially undergo a process referred to as network abstraction layer (NAL) decoding, indicated at 302. The Network Abstraction Layer (NAL) is a part of streaming data standards, such as the H.264/AVC and HEVC video coding standards. The main goal of the NAL is the provision of a "network-friendly" representation of streaming data for "conversational" (e.g., video telephony) and "non-conversational" (storage, broadcast, or streaming) applications. NAL decoding may remove from the data 301 information added to assist in transmitting the data. Such information, referred to as a "network wrapper" may identify the data 201 as video data or indicate a beginning or end of a bitstream, bits for alignment of data, and/or metadata about the video data itself.

In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section. Due to its complexity, NAL decoding is typically done on a picture and slice level. The smallest NAL buffer used for NAL decoding is usually slice sized. The example illustrated in FIG. 3 is described in terms of macroblocks and the AVC (H.265) standard. However, these are not limiting features of aspects of the present disclosure. For example, in the latest H265 (HEVC) standard, there is no macroblock concept. Instead, more flexible Coding Unit (CU), Prediction Unit, (PU), Transform Unit (TU) concepts are introduced. Aspects of the present disclosure may operate in conjunction with such coding standards.

In some embodiments, after NAL decoding at 302, the remaining decoding illustrated in FIG. 3 may be implemented in three different thread groups or task groups referred to herein as video coded layer (VCL) decoding 304, motion vector (MV) reconstruction 310 and picture reconstruction 314. The picture reconstruction task group 214 may include pixel prediction and reconstruction 316 and post processing 320. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain coding standards may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 304 are typically at the macroblock level for macroblocks within the same slice. Consequently results produced by the VCL decoding process 304 may be buffered at the macroblock level.

VCL decoding 304 often includes a process referred to as Entropy Decoding 306, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bitstreams. Decoding the entropy layer of AVC(H.264)-coded data streams can be computationally intensive and may present challenges for devices that decode AVC (H.264)-coded bitstreams using general purpose microprocessors. For this reason, many systems use a hardware decoder accelerator.

In addition to Entropy Decoding 306, the VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks.

VCL decoding 304 may be implemented at a macroblock level data dependency frequency. Specifically, different macroblocks within the same slice may undergo VCL decoding in parallel and the results may be sent to the motion vector reconstruction task group 210 for further processing.

Subsequently, all macroblocks in the picture or section may undergo motion vector reconstruction 310. The MV reconstruction process 310 may involve motion vector reconstruction 312 using headers from a given macroblock 311 and/or co-located macroblock headers 313. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process based on residual pixels from the VCL decoding process 304 and motion vectors from the MV reconstruction process 310. The data dependency frequency (and level of parallelism) for the MV depends on whether the MV reconstruction process 310 involves co-located macroblocks from other pictures. For MV reconstruction not involving co-located MB headers from other pictures the MV reconstruction process 310 may be implemented in parallel at the slice level or picture level. For MV reconstruction involving co-located MB headers the data dependency frequency is at the picture level and the MV reconstruction process 310 may be implemented with parallelism at the slice level.

The results of motion vector reconstruction 310 are sent to the picture reconstruction task group 314, which may be parallelized on a picture frequency level. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be parallelized to enhance the efficiency of decoding. These tasks may be parallelized within the picture reconstruction task group 314 at a macroblock level based on data dependencies. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks. Pixel prediction and reconstruction 318 produces decoded sections 319 (e.g. decoded blocks or macroblocks) that include neighbor pixels which may be used as inputs to the pixel prediction and reconstruction process 318 for a subsequent macroblock. The data dependencies for pixel prediction and reconstruction 316 allow for a certain degree of parallel processing at the macroblock level for macroblocks in the same slice.

The post processing task group 320 may include a de-blocking filter 322 that is applied to blocks in the decoded section 319 to improve visual quality and prediction performance by smoothing the sharp edges which can form between blocks when block coding techniques are used. The de-blocking filter 322 may be used to improve the appearance of the resulting de-blocked sections 324.

The decoded section 319 or de-blocked sections 324 may provide neighboring pixels for use in de-blocking a neighboring macroblock. In addition, decoded sections 319 including sections from a currently decoding picture may provide reference pixels for pixel prediction and reconstruction 318 for subsequent macroblocks. It is during this stage that pixels from within the current picture may optionally be used for pixel prediction within that same current picture as described above, independent of whether the picture (or subsections thereof) is inter-coded or intra-coded. De-blocking 320 may be parallelized on a macroblock level for macroblocks in the same picture.

The decoded sections 319 produced before post processing 320 and the post-processed sections 324 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

Thus, for H.264, after pixel decoding, the decoded section 319 is saved in the output picture buffer. Later, the post processed sections 324 replace the decoded sections 319 in the output picture buffer. For non-H.264 cases, the decoder only saves decoded sections 319 in the output picture buffer. The post processing is done at display time and the post processing output may not share the same buffer as the decoder output picture buffer.

Up-Sampling With Edge Enhancement

Figure 4A:
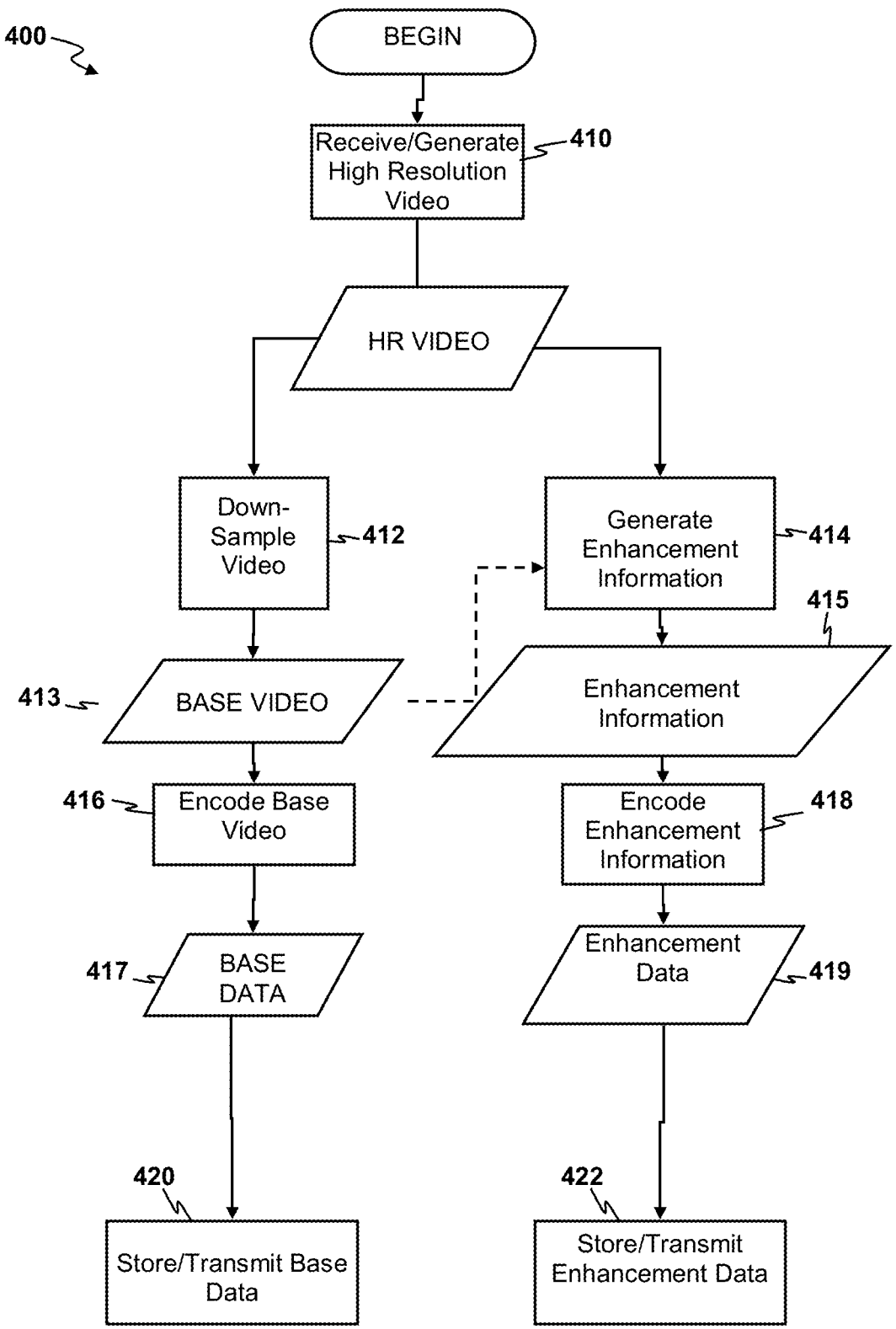
FIG. 4A is a flow diagram illustrating encoding video and edge enhancement streams in accordance with aspects of the present disclosure.

Aspects of the present disclosure provide methods to implement up-sampling with enhancement information in encoding and decoding of digital pictures. By way of example, and not by way of limitation, FIG. 4A illustrates a method 400 of encoding video and edge enhancement streams in accordance with aspects of the present disclosure. The method 400 begins by receiving or generating high resolution video 410. The high resolution video 410 may be down-sampled at 412, resulting in base video 413. From this high resolution video 410, and optionally using base video 413, enhancement information 415 may be generated at 414. Base video 413 may then be encoded, resulting in base data 417. Base data 417 may subsequently be stored or transmitted at 420. The enhancement information 415 may be encoded at 418, compressed into an enhancement data at 419, and then stored or transmitted at 422. Depending on the way the enhancement information 415 is packed, there could be more frames in the enhancement data 419 than in the base data 417 or vice versa.

In some implementations, down-sampling the high resolution video at 412 may include determining whether there is enough detail in a given frame or frames to justify sending them as high resolution frames and, if not, such frames may be encoded as reconstructed frames corresponding to given frames down-sampled to lower resolution down-sampled frames with fewer pixels than the given frames. The restructured frames may include lower resolution pixels of the down-sampled frames surrounded by pixels of uniform pixel values along with parameters indicating which sections of the restructured frames contain the low resolution pixels.

In some implementations, the edge enhancement information 415 may be compared to a threshold to determine whether generating the enhancement information would be sufficiently advantageous in terms of reduced bit usage. By way of example, it might not be advantageous to down-sample a frame and generate edge enhancement information where it is known that the frame will be decoded by hardware capable of decoding high resolution frames and the bitrate savings gained by down-sampling and edge enhancement are not great enough to justify the computational cost of doing so. If generating the edge enhancement information would not be advantageous for a given frame, that frame may be encoded as an original high resolution frame without down-sampling and generating edge enhancement information.

For the purposes of example single stage of down-sampling 412 and enhancement information generation 414 are shown in FIG. 4A. However, aspects of the present disclosure include implementations that use multiple stages of down-sampling and enhancement information generation to generate the base data 417 and enhancement data 419. By way of example and not by way of limitation, multi-stage down-sampling may involve a cascade scheme, in which one or more high resolution input frames are down-sampled to lower resolutions in two or more stages. The down-sampled frame generated at a given stage serves as the input frame for the next stage. Enhancement information can be generated at each stage of down-sampling from a difference between the input frame for that stage and an up-sampled version of the down-sampled frame generated at that stage. The lowest resolution frame or frames generated in the last stage cascade are then encoded to create the set of base data 417 and the enhancement information created at each stage may be encoded to generate multiple sets of enhancement data 419. Encoding for such a cascade scheme may be implemented with multiple encoders, e.g., one or more encoders for encoding the lowest resolution frame and two or more additional encoders, with a separate one for encoding the enhancement information created at each stage of the cascade. The base data 419 may then be transmitted or stored for later decoding and regeneration of the high resolution image. Network bandwidth limitations may determine which sets of enhancement data (if any) are sent with the base data for subsequent decoding to regenerate higher resolution frames after base data 417 is decoded.

As a more specific example, a 4K frame may be down-sampled from 4K to 1080P and first stage enhancement information may be generated from a difference between a version of the 1080P frame up-sampled to 4K and the original 4K frame. The resulting 1080P frame may then be down-sampled to 540P and second stage enhancement information may be generated from a difference between a version of the 540P frame up-sampled to 1080P and the 1080P frame. The 540P frame may then be down-sampled to 270P and third stage enhancement information generated from a difference between a version of the 270P frame up-sampled to 540P and the 540P frame. The encoder may then encode the 270P frame to generate the base data and encode the first, second, and third stage enhancement information to generate the enhancement data 419.

Figure 4B:
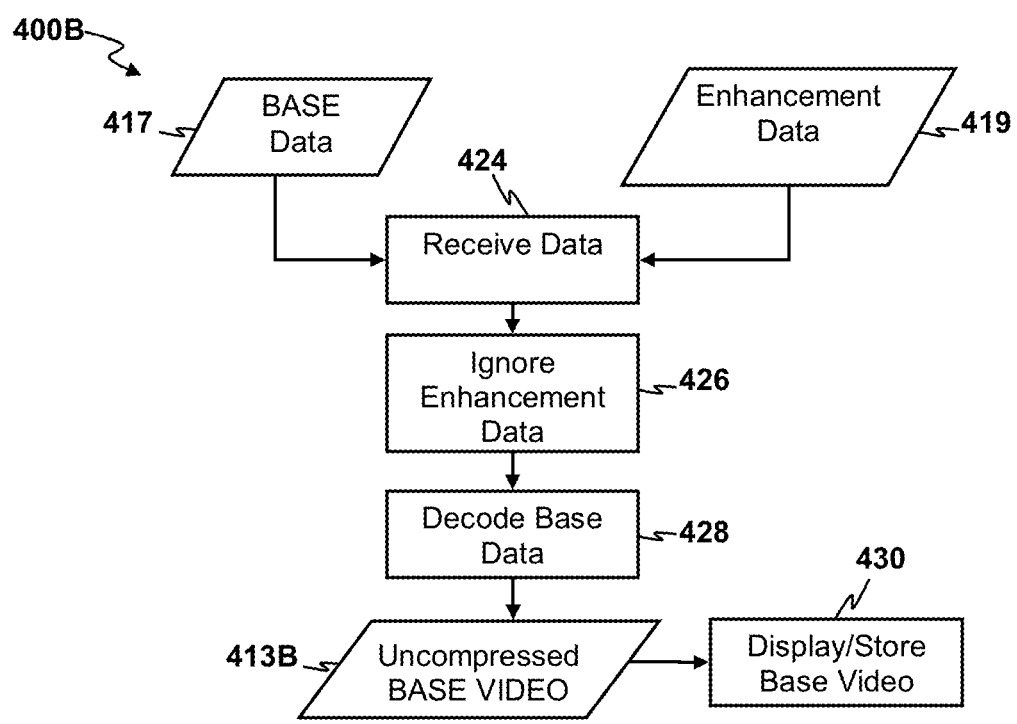
FIG. 4B is a flow diagram illustrating decoding video and edge enhancement streams on low powered hardware in accordance with aspects of the present disclosure.

FIG. 4B illustrates an example method 400B of decoding video and edge enhancement streams on low powered hardware in accordance with aspects of the present disclosure. Base data 417 and compressed enhancement data 419 may be received by a decoder at 424. In this example, the hardware receiving the aforementioned base data 417 and enhancement data 419 is low powered, and is unable to effectively display or output high resolution video. Accordingly, the enhancement stream 419 may be ignored at 426. The base data 417 may then be decoded at 428, and the resulting uncompressed base video 413B may then be stored or displayed at 430.

Figure 4C:
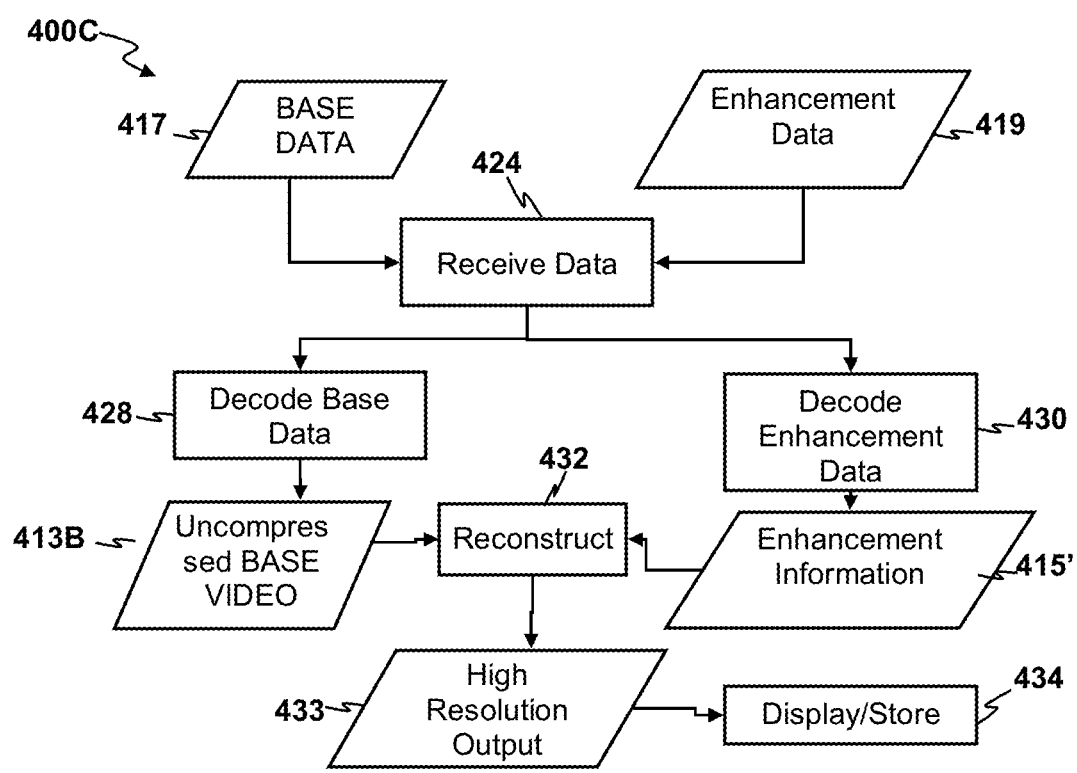
FIG. 4C is a flow diagram illustrating decoding video and edge enhancement streams on high powered hardware in accordance with aspects of the present disclosure.

FIG. 4C illustrates an example method 400C of decoding video and edge enhancement streams on high powered hardware in accordance with aspects of the present disclosure. Base data 417 and compressed enhancement stream 419 may be received by a decoder at 424. In this example, the hardware receiving the streams 417 and 419 is high powered, and is accordingly capable of effectively displaying or outputting high resolution video. Thus, the base data 417 may be decoded at 428 to provide uncompressed base video 413B, and the compressed enhancement stream 419 may be decoded at 430 to provide uncompressed enhancement data 415'. The uncompressed base video 413B and uncompressed enhancement data 415' may then be reconstructed at 432 to provide high resolution output 433. This high resolution output may then be displayed or stored at 434.

As noted above, the enhancement data 419 may include multiple stages of enhancement data for generating multiple resolutions of a frame. The decoder may determine which sets of enhancement data 419 to decode and use to regenerate higher resolution output 433 after decoding the base data 419 using the reverse process of the cascade scheme described above to generate multiple levels of enhancement information. Specifically, the decoded base data may be up-sampled and combined with enhancement data at two or more stages in a staircase fashion with the result of up-sampling and combination at a given step of the staircase being used as the input for the next step.

Decoding base data 417 and multi-stage enhancement data 419 encoded using a cascade scheme, as described above, may be implemented with multiple decoders, e.g., one or more decoders for decoding the base data and two or more additional decoders, with a separate one for decoding the enhancement data created at each stage of the cascade.

As a more specific example, consider the case described above with respect to the multi-stage encoding. Decoding the base data produces a 270P frame, which may be up-sampled to 540P and combined with third-stage enhancement information to generate a 540P frame. The 540P frame may be up-sampled and combined with second stage enhancement information to generate a 1080P frame. The 1080P frame may be up-sampled to 4K and combined with first stage enhancement information to generate a 4K frame. The decoder may decide at which stage to stop the up-sampling and combination.

In some implementations, the base data 417 may include encoded restructured frames corresponding to original given high-resolution frames down-sampled to lower resolution frames with fewer pixels than the given frames. The number of pixels in the restructured frame is the same as in the original given high resolution frame, but only a portion of the restructured frame contains pixels that correspond to the original high resolution frame. The restructured frames include lower resolution pixels of the down-sampled frames surrounded by pixels of uniform pixel values along with code-specific parameters indicating which sections of the restructured frames contain the low resolution pixels. In such cases, decoding the base data at 428 may include decoding such restructured frames by using codec specific parameters to extract the low resolution pixels of the down-scaled frame from the encoded restructured frame and then up-sampling the resulting extracted down-scaled frame.

In some implementations, the data 417, 419, e.g., base data 417 may include one or more frames encoded as original high resolution frames without down-sampling or enhancement information. Such frames may be decoded as would normally be done for original high resolution frames.

Aspects of the present disclosure are not limited to implementations in which the enhancement information is used for an entire frame. In some implementations, a decoder may decode only a subset of the enhancement data 419. The resulting enhancement information may be used to enhance only a portion of the high resolution frame resulting from up-sampling the base frame, e.g., a portion corresponding to a 'region of interest.' In another alternative implementation within the scope of the present disclosure the decoder may decode the enhancement data completely, but in the reconstruction stage, the enhancement is only performed for the region of interest.

Figure 5:
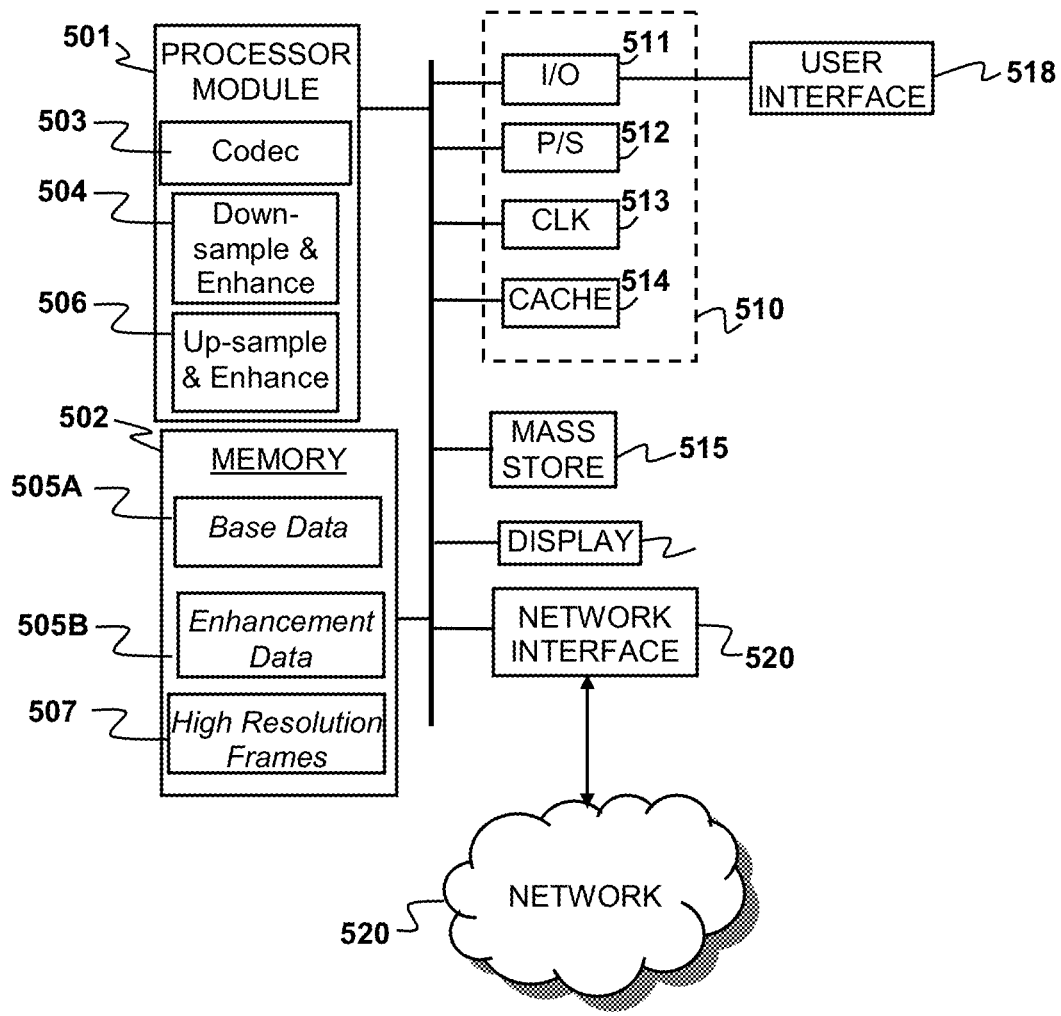
FIG. 5 is a block diagram illustrating an apparatus for encoding and/or decoding a digital picture configured to implement picture quality oriented rate control adjustment according to aspects of the present disclosure.

Aspects of the present disclosure include systems configured to implement up-sampling with edge enhancement in encoding and decoding of digital pictures, as described above. By way of example, and not by way of limitation, FIG. 5 illustrates a block diagram of a computer system 500 that may be used to implement aspects of the present disclosure. According to aspects of the present disclosure, the system 500 may be an embedded system, mobile phone, personal computer, tablet computer, portable game device, workstation, game console, and the like. The system 500 generally may include a processor module 501 and a memory 502. The processor module 501 may include one or more processor cores, e.g., in single core, dual core, quad core, processor-coprocessor, CPU-GPU, or Cell processor architectures.

The memory 502 may be in the form of an integrated circuit, e.g., RAM, DRAM, ROM, and the like. The memory may also be a main memory that is accessible by all of the processor cores in the processor module 501. In some embodiments, the processor module 501 may have local memories associated with one or more processor cores or one or more co-processors. A codec program 503 may be stored in the main memory 502 in the form of processor readable instructions that can be executed on the processor module 501. The codec 503 may be configured to encode digital pictures. By way of example, and not by way of limitation, the codec 503 may be configured to encode digital pictures or sections of digital pictures as discussed above with respect to FIG. 2A. The codec 503 may also be configured to decode encoded digital pictures, e.g., as described above with respect to FIG. 3. A down-sampling and enhancement program 504 may generate base frames 505A and enhancement information 505B from input high resolution frames 507 in conjunction with the codec 503, as described with respect to FIG. 4A. An up-sampling and enhancement program 506 may implement decoder side regeneration of high resolution frames 507 from decoded base frames 505A and enhancement information 505B, e.g., as discussed above with respect to FIG. 4B. The up-sampling and enhancement program 506 may alternatively ignore the enhancement information 505B, e.g., as described above with respect to FIG. 4C. The codec 503 and down-scaling and enhancement program 504 and up-sampling and enhancement program 506 may be written in any suitable processor readable language, e.g., C, C++, JAVA, Assembly, MATLAB, FORTRAN and a number of other languages.

Input or output high resolution frames 507 may be stored in memory 502. The memory may also store other relevant parameters for encoding and/or decoding frames, such as λ versus QP table that remains fixed during the encoding of a picture or over the course of encoding multiple pictures. During execution of the codec 503, programs 504, 506, portions of program code, base frames 505A, enhancement information 505B and/or high resolution frames 507 may be loaded into the memory 502 or the local stores of processor cores for processing by the processor 501. By way of example, and not by way of limitation, the high resolution frames 507 may include input frames (e.g., video or audio frames), or sections thereof, before encoding or decoding or at intermediate stages of encoding or decoding. In the case of encoding, the data corresponding to the input high resolution frames 507 may include buffered portions of streaming data, e.g., unencoded frames or portions thereof. In the case of decoding, the base data 505A and enhancement data 505B may include input data in the form of un-decoded sections, sections that have been decoded, but not post-processed and sections that have been decoded and post-processed. Such input data may include data packets containing data representing one or more coded sections of one or more digital pictures, coded digital audio digital frames, or other coded streaming data. By way of example, and not by way of limitation, such data packets may include a set of transform coefficients and a partial set of prediction parameters. These various sections may be stored in one or more buffers. In particular, decoded and/or post processed sections may be stored in an output picture buffer implemented in the memory 502.

The system 500 may also include well-known support functions 510, such as input/output (I/O) elements 511, power supplies (P/S) 512, a clock (CLK) 513 and cache 514. The apparatus 500 may optionally include a mass storage device 515 such as a disk drive, CD-ROM drive, tape drive, or the like to store programs and/or data. The device 800 may also optionally include a display unit 516 and user interface unit 518 to facilitate interaction between the apparatus 500 and a user. The display unit 516 may be in the form of a cathode ray tube (CRT) or flat panel screen that displays text, numerals, graphical symbols or images. The user interface 518 may include a keyboard, mouse, joystick, light pen, or other device that may be used in conjunction with a graphical user interface (GUI). The apparatus 500 may also include a network interface 520 to enable the device to communicate with other devices over a network 522, such as the interne. These components may be implemented in hardware, software, or firmware, or some combination of two or more of these.

By way of example, and not by way of limitation, the system 500 may transmit encoded or unencoded streaming data to other devices connected to the network 522 or receive encoded or unencoded streaming data from such devices via the network interface 520. In a particular implementation, encoded streaming data in the form of one or more encoded sections of a digital picture and/or one or more frames of encoded video may be transmitted from the system over the network 522. To implement transmitting or receiving streaming data, the processor module may execute instructions implementing a network protocol stack.

By way of example, and not by way of limitation, digital pictures may be generated with a digital camera, which may be part of the user interface 518 or which may be a separate peripheral coupled to the system 500, e.g., via the I/O elements 511. According to some aspects, the digital pictures may be generated by a software application executed by the processor module 501.

Aspects of the present disclosure allow for lower bit usage than for conventional encoding of high resolution frames. In particular, down-sampling input digital frames, creating enhancement information, encoding the down-sampled frames and enhancement information as described herein generates the base stream and enhancement stream using fewer bits than by down-sampling the same input digital frames and encoding both the down-sampled frames and the one-or more input digital frames into first and second streams, as is conventionally done. Such lower bit usage is particularly advantageous when transmitting frames over networks with limited bandwidth. By way of example and not by way of limitation, encoding high resolution video through down-sampling and then up-sampling with edge enhancement can produce better quality video upon decoding than pure up-sampling.

Figure 6:
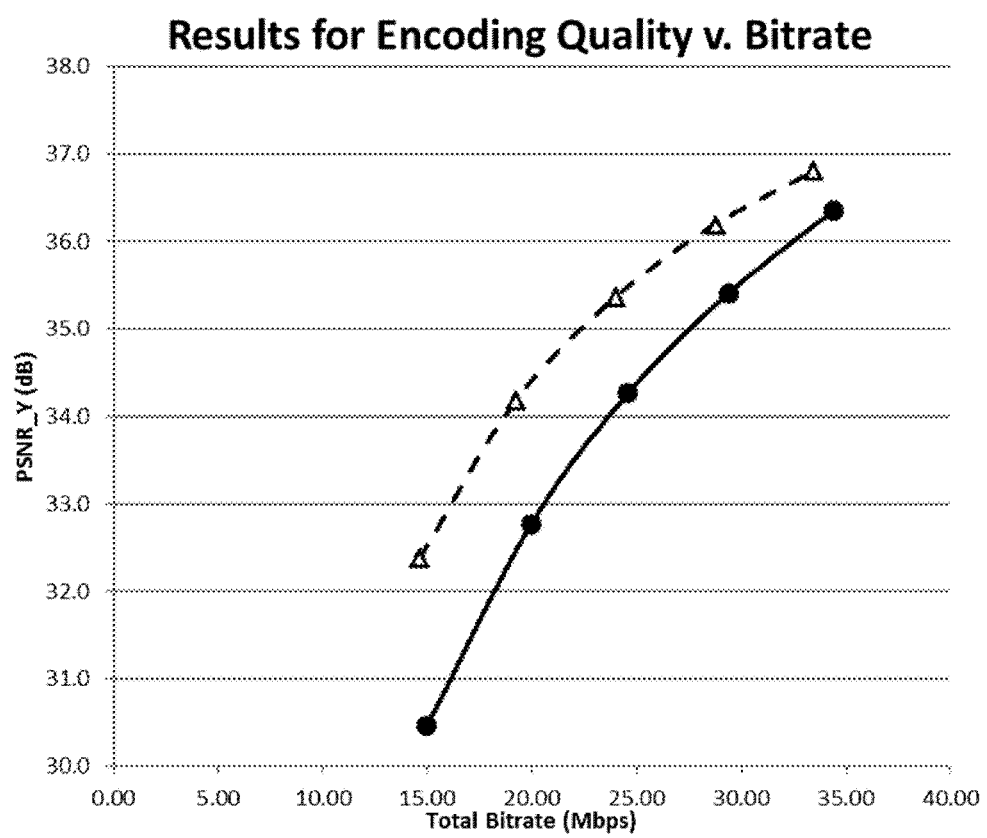
FIG. 6 is a graph comparing plots of quality versus bitrate for digital frames encoded conventionally and according to aspects of the present disclosure.

For some cases, the type of encoding and decoding described herein allows a better quality even compared to the original high resolution video. The graph depicted in FIG. 6 shows experimental results indicating that there are certain types of sequences and bitrates where this is true. In the plots that are depicted, the dashed line represents picture quality for 4K pictures that were reconstructed using a down-sampled 1080p stream with 5 Mbps of enhancement data. The solid line represents standard natively encoded 4K pictures. For bitrates where the dashed line is higher than the solid line, the picture quality using up-sampling with edge enhancement is better than the original 4K.

Aspects of the present disclosure provide for reduced bit usage and therefore better usage of available bandwidth in streaming data applications, such as streaming video. Reduced bit usage could also lead to reduced utilization of system resources such as the CPU on the decoder side. Aspects of the present disclosure may be incorporated into systems that produce digital pictures, encode them for transmission over a network, and transmit them over the network.

Aspects of the present disclosure include implementations in which there are multiple sets of base data and multiple sets of enhancement data. By way of example, and not by way of limitation encoding may involve multiple down-sampling stages, with each stage producing sets of data that correspond to progressively lower resolutions. Specifically, each stage may down-sample the same high resolution input frames to generate a different corresponding set of lower resolution base frames and generate a corresponding set of enhancement information. Each set of base frames and corresponding set of enhancement information may then be encoded to produce corresponding sets of base data and enhancement data. The high resolution frames may be reconstructed on the decoder side from multiple sets of base data and enhancement data.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for encoding one or more input digital frames, comprising:
   down-sampling the one or more input digital frames to create one or more base frames characterized by a lower resolution than the input digital frames;
   creating enhancement information corresponding to a difference between pixels values of the one or more input digital frames and corresponding pixel values of up-sampled versions of the one or more base frames wherein the enhancement information is created before performing image compression;
   encoding the one or more base frames to form a set of base data;
   encoding the enhancement information to form a set of enhancement data; and
   transmitting the set of base data and the set of enhancement data over a network or storing the set of base data and the set of enhancement data in a memory.

2. The method of claim 1, wherein the enhancement information is created in such a way as to minimize an arithmetic difference between the pixel values of the one or more input digital frames and corresponding pixel values of the up-sampled versions of the one or more base frames.

3. The method of claim 1, wherein an average time needed to generate a frame by decoding the base data and enhancement data is not higher than a time needed to decode an input frame encoded without down-sampling and without using an enhancement data.

4. The method of claim 1, wherein the enhancement information is encoded in a video format.

5. The method of claim 4, wherein the video format is an AVC or High Efficiency Video Coding (HEVC) format.

6. The method of claim 4, wherein the set of base data includes one or more base frames encoded as Intra-Frames (I-frames) or Predictive Frames (P-frames) and the set of enhancement data includes one or more frames encoded as Bipredicitve Frames (B-frames).

7. The method of claim 4, wherein the set of base data includes one or more base frames encoded as Intra-Frames (I-frames) and the set of enhancement data includes one or more frames encoded as Predictive Frames (P-frames) or Bipredictive Frames (B-frames).

8. The method of claim 4, wherein the set of base data includes one or more base frames encoded as Intra-Frames (I-frames) or Predictive Frames (P-frames) and the set of enhancement data includes one or more frames encoded as Bi-Predictive Frames (B-frames), wherein the one or more B-frames can use the I-frames or P-frames as reference frames, but not vice versa.

9. The method of claim 4, wherein the set of base data includes one or more base frames encoded as Intra-Frames (I-frames) or Predictive Frames (P-frames) and the set of enhancement data includes one or more frames encoded as Bi-Predictive Frames (B-frames), wherein one or more of the B-frames can be used as reference for one or more other B-frames.

10. The method of claim 1, wherein the enhancement information is encoded in a format other than a video format.

11. The method of claim 1, wherein both the base data and enhancement data are stored or transmitted as a common set of data.

12. The method of claim 1, wherein encoding the one or more base frames and encoding the enhancement information is performed with a single encoder.

13. The method of claim 1, wherein encoding the one or more base frames and encoding the enhancement information is performed with a single encoder, wherein the single encoder encodes the enhancement data and the one or more base frames into a common set of data corresponding to the set of base data and the set of enhancement data.

14. The method of claim 12, wherein encoding the enhancement information includes encoding the enhancement information into headers of data packets in the common bitstream.

15. The method of claim 12, wherein encoding the enhancement information includes encoding the enhancement information into headers of data packets in the common bitstream and wherein the headers of the data packets include information indicating whether a frame associated with the data packet corresponds to a base frame or enhancement information.

16. The method of claim 1, wherein encoding the one or more base frames and encoding the enhancement information is performed with a single encoder, wherein the single encoder encodes the enhancement data and the one or more base frames into a common set of data corresponding to the set of base data and the set of enhancement data wherein encoding the base frames is encoded independent of the enhancement information in a way that allows the set of base data to be decoded without fully decoding any enhancement information encoded into the set of enhancement data.

17. The method of claim 1, wherein encoding the enhancement information includes processing some luminance information as chrominance information.

18. The method of claim 17, wherein encoding the enhancement information includes processing some of the luminance information as chrominance information while the rest of the luminance information remains luminance information.

19. The method of claim 1, wherein encoding the enhancement information includes processing chrominance as a flat value.

20. The method of claim 1, further comprising determining whether a given input digital frame of the one or more input frames has enough detail to be sent at a full resolution and if the given frame does not have enough detail to be sent at the full resolution, down-sampling the frame to a lower resolution down-sampled frame having fewer pixels than the given frame, and encoding the resulting down-sampled frame as a restructured frame containing low resolution pixels surrounded by pixels of uniform pixel values along with parameters indicating which sections of the restructured frame that contain the low resolution pixels, wherein a total number of pixels in the restructured frame is the same as in the given frame, but only a portion of the pixels of the restructured frame correspond to pixels of the given frame.

21. The method of claim 1, further comprising, determining whether sending a given frame of the one or more input digital frames at high resolution would be inefficient, and if it is determined that sending the given frame at high resolution would be inefficient, down-sampling the given frame to create a corresponding base frame characterized by a lower resolution than the given frame, creating enhancement information for the given frame corresponding to a difference between pixels values of the given frame and corresponding pixel values of an up-sampled version of the corresponding base frame; encoding the corresponding base frame into the base data, and encoding the enhancement information for the given frame into the enhancement data.

22. The method of claim 1, wherein encoding the enhancement information includes encoding luminance information and ignoring chrominance information.

23. The method of claim 22, wherein encoding the enhancement information includes processing some luminance information as chrominance information.

24. The method of claim 1, wherein creating the enhancement information includes analyzing the one or more input digital frames to find edges.

25. The method of claim 24, wherein analyzing the one or more input digital frames includes comparing an up-sampled low resolution image to an original high resolution image and determining differences between the up-sampled low resolution image and the original high resolution image.

26. The method of claim 24, wherein analyzing the one or more input digital frames includes comparing an up-sampled low resolution image to an original high resolution image and determining differences between the up-sampled low resolution image and the original high resolution image with a graphics processing unit (GPU).

27. The method of claim 24, wherein analyzing the one or more input digital frames includes comparing an up-sampled low resolution image to an original high resolution image and determining differences between the up-sampled low resolution image and the original high resolution image with a central processing unit (CPU).

28. The method of claim 24, wherein analyzing the one or more input digital frames includes determining a difference between a value of each pixel of an up-sampled low resolution image and a value for each corresponding pixel in an original high resolution image corresponding to the up-sampled low resolution image and representing the difference with a smaller number of bits than a number of bits for each pixel value of the up-sampled low resolution image or the original high resolution image.

29. The method of claim 1, further comprising comparing the edge enhancement information to a threshold and determining whether down-sampling and generating enhancement information would not be advantageous, and encoding input frames of the one or more input frames for which down-sampling and generating enhancement information would not be advantageous as original high resolution frames without down-sampling and generating enhancement information.

30. The method of claim 1, further comprising filtering the enhancement information to make the enhancement information more suitable for video compression.

31. The method of claim 30, wherein filtering the enhancement information includes removing isolated pixels that are of a much different value than surrounding pixels.

32. The method of claim 1, wherein the one or more digital frames correspond to one or more video frames.

33. The method of claim 1, wherein the one or more digital frames correspond to one or more audio frames.

34. The method of claim 1, wherein the one or more digital frames correspond to one or more still image frames.

35. The method of claim 1, wherein there are more frames in the enhancement stream than in the base stream.

36. The method of claim 1, wherein there are more frames in the base stream than in the enhancement stream.

37. The method of claim 1, wherein the one or more base frames and enhancement information are configured such that high resolution frames constructed by combining the base frames with the enhancement information results in one or more reconstructed frames corresponding to the one or more input digital frames, wherein the one or more reconstructed frames are characterized by higher quality than the one or more input digital frames.

38. The method of claim 1, wherein down-sampling the one or more input digital frames, creating the enhancement information, encoding the one or more base frames, and encoding the enhancement information generates the base data and enhancement data using fewer bits than by down-sampling the one or more input digital frames and encoding the one or more down-sampled frames and the one or more input digital frames into first and second streams.

39. The method of claim 1, wherein down-sampling the one or more input digital frames and creating the enhancement information includes a multi-stage cascaded down-sampling scheme, in which the one or more input digital frames are down-sampled to lower resolutions in two or more stages with a set of enhancement information generated at each of the two or more stages to generate one or more lowest resolution base frames and two or more sets of enhancement information for the one or more lowest resolution base frames and wherein encoding the one or more base frames, and encoding the enhancement information includes encoding the one or more lowest resolution base frames to create the set of base data and encoding the two or more sets of enhancement information to create the enhancement data.

40. A system, comprising:
a processor module;
a memory coupled to the processor, wherein the memory contains executable instructions configured to implement a method, the method comprising:
down-sampling one or more input digital frames to create one or more base frames characterized by a lower resolution than the input digital frames;
creating enhancement information corresponding to a difference between pixels values of the one or more input digital frames and corresponding pixel values of up-sampled versions of the one or more base frames wherein the enhancement information is created before performing image compression;

encoding the one or more base frames to form a set of base data;

encoding the enhancement information to form a set of enhancement data; and transmitting the set of base data and the set of enhancement data over a network or storing the set of base data and the set of enhancement data in a memory.

41. A non-transitory computer readable medium having embodied therein computer readable instructions configured, to implement a method, the method comprising:

down-sampling one or more input digital frames to create one or more base frames characterized by a lower resolution than the input digital frames;

creating enhancement information corresponding to a difference between pixel values of the one or more input digital frames and corresponding pixel values of up-sampled versions of the one or more base frames wherein the enhancement information is created before performing image compression;

encoding the one or more base frames to form a set of base data;

encoding the enhancement information to form a set of enhancement data; and transmitting the set of base data and the set of enhancement data over a network or storing the set of base data and the set of enhancement data in a memory.

42. A method for decoding an input set of data containing one or more encoded digital frames including a set of base data containing one or more encoded base frames corresponding to one or more down-sampled input digital frames, wherein the one or more base frames are characterized by a lower resolution than the input digital frames and a set of enhancement data containing encoded enhancement information corresponding to a difference between pixel values of the one or more input digital frames and corresponding pixel values of up-sampled versions of the one or more base frames, the method comprising:

decoding the one or more encoded base frames in the set of base data with a decoder to generate the one or more base frames;

decoding the encoded enhancement information in the set of enhancement data with a decoder to generate the enhancement information;

reconstructing the input digital frames from the one or more base frames and the enhancement information with a decoder; and displaying the input digital frames with a display or storing the input digital frames in a memory.

43. The method of claim 42, wherein the enhancement information is created in such a way as to minimize an arithmetic difference between the pixel values of the one or more input digital frames and corresponding pixel values of the one or more base frames.

44. The method of claim 42, wherein reconstructing the input digital frames from the one or more base frames and the enhancement information with the decoder includes up-sampling the one or more base frames to produce one or more corresponding up-sampled frames and performing an inverse of an operation that generated the enhancement information with the one or more up-sampled frames and the enhancement information.

45. The method of claim 42, wherein the set of enhancement data includes some luminance data encoded as chrominance data, wherein decoding the enhancement data includes moving the luminance information processed as chrominance information back to luminance information.

46. The method of claim 42, wherein the set of enhancement data includes some luminance data encoded as chrominance data, wherein decoding the enhancement data includes moving the luminance information processed as chrominance information back to luminance information and ignoring any remaining chrominance information in the enhancement information.

47. The method of claim 42, wherein one or more first decoders decode the one or more encoded base frames in the base stream and one or more second decoders decode the encoded enhancement information in the enhancement stream.

48. The method of claim 47, wherein the one or more first decoders include one or more hardware decoders and the one or more second decoders include one or more software decoders.

49. The method of claim 47, wherein the one or more first decoders include one or more software decoders and the one or more second decoders include one or more hardware decoders.

50. The method of claim 47, wherein the first and second decoders include two or more instances of a software decoder.

51. The method of claim 47, wherein the one or more first decoders and the one or more second decoders are hardware decoders.

52. The method of claim 42, wherein both the set of base data and the set of enhancement data are in a common bitstream.

53. The method of claim 42, wherein the set of base data includes one or more encoded base frames that are encoded independent of the enhancement information in a way that allows the set of base data to be decoded without fully decoding any enhancement information encoded into the set of enhancement data.

54. The method of claim 53, wherein decoding the one or more encoded base frames in the set of base data includes decoding the one or more encoded base frames without decoding the encoded enhancement information.

55. The method of claim 42, wherein both the set of base data and the set of enhancement data are in a common bitstream, wherein the encoded enhancement information is encoded into headers of data packets in the common bitstream.

56. The method of claim 55, wherein the encoded base frames in the set of base data do not reference any frames containing the enhancement information and wherein decoding the encoded enhancement information in the set of enhancement data includes extracting the enhancement information from the headers.

57. The method of claim 56, wherein the encoded base frames in the set of base data do not reference any frames containing the enhancement information and wherein decoding the encoded enhancement information in the set of enhancement data includes extracting the enhancement information from the headers of the data packets into which the enhancement information is encoded and skipping decoding of remaining portions of those data packets.

58. The method of claim 42, wherein the enhancement information includes luminance information but not chrominance information.

59. The method of claim 58, wherein the enhancement information includes some luminance information processed as chrominance information.

60. The method of claim 42, wherein the enhancement information includes some luminance information processed as chrominance information.

61. The method of claim 42, wherein the one or more encoded base frames in the base stream include a restructured frame corresponding to a given frame down-sampled to a lower resolution down-sampled frame having fewer pixels than the given frame, wherein the restructured frame includes lower resolution pixels of the down-sampled frame surrounded by pixels of uniform pixel values along with parameters indicating which sections of the restructured frame that contain the low resolution pixels, wherein decoding the one or more encoded base frames in the base stream includes decoding the restructured frame using the parameters to extract the down-scaled frame and then up-sampling the extracted down-scaled frame.

62. The method of claim 61, wherein a total number of pixels in the restructured frame is the same as in the given frame, but only a portion of the pixels of the restructured frame correspond to pixels of the given frame.

63. The method of claim 42, wherein there are more frames in the enhancement stream than in the base stream.

64. The method of claim 42, wherein there are more frames in the set of base data than in the set of enhancement data.

65. The method of claim 42, wherein the set of base data includes one or more frames encoded as original high resolution frames without down-sampling, the method further comprising decoding the one or more frames encoded as original high resolution frames.

66. The method of claim 42, wherein the one or more encoded digital frames correspond to one or more video frames.

67. The method of claim 42, wherein the one or more encoded digital frames correspond to one or more audio frames.

68. The method of claim 42, wherein the one or more encoded digital frames correspond to one or more still image frames.

69. The method of claim 42, wherein the set of enhancement data includes encoded enhancement information for two or more stages of down-sampling, wherein reconstructing the one or more input digital frames includes be up-sampling the base data to generate one or more resulting up-sampled digital frames and combining the one or more resulting up-sampled digital frames with enhancement information for one or more stages of the two or more stages.

70. The method of claim 69, wherein the one or more resulting up-sampled digital frames generated at a given step of the staircase are used as an input for a next step of up-sampling and combining with enhancement information for a different stage of the two or more stages.

71. The method of claim 42, wherein decoding the encoded enhancement information in the set of enhancement data decoding only a subset of less than all the enhancement data.

72. The method of claim 71, wherein reconstructing the input digital frames from the one or more base frames and the enhancement information includes enhancing only a portion of the high resolution frame resulting from up-sampling with the enhancement information resulting from decoding only the subset of less than all the enhancement data.

73. The method of claim 42, wherein decoding the encoded enhancement information in the set of enhancement data includes decoding all the enhancement data and wherein reconstructing the input digital frames from the one or more base frames includes enhancing only a portion of the high resolution frame resulting from up-sampling with a subset of the enhancement information resulting from decoding all the enhancement data.

74. A system, comprising:
a processor module;
a memory coupled to the processor, wherein the memory contains executable instructions configured to implement a method for decoding an input set of data containing one or more encoded digital frames including a set of base data containing one or more encoded base frames corresponding to one or more down-sampled input digital frames, wherein the one or more base frames are characterized by a lower resolution than the input digital frames and a set of enhancement data containing enhancement information corresponding to a difference between pixel values of the one or more input digital frames and corresponding pixel values of up-sampled versions of the one or more base frames, the method comprising:
decoding the one or more encoded base frames in the set of base data with a decoder to generate the one or more base frames;
decoding the encoded enhancement information in the set of enhancement data with a decoder to generate the enhancement information;
reconstructing the input digital frames from the one or more base frames and the enhancement information with a decoder; and
displaying the input digital frames with a display or storing the input digital frames in a memory.

75. A non-transitory computer readable medium having embodied therein computer readable instructions configured, to implement a method for decoding an input set of data containing one or more encoded digital frames including a set of base data containing one or more encoded base frames corresponding to one or more down-sampled input digital frames, wherein the one or more base frames are characterized by a lower resolution than the input digital frames and a set of enhancement data containing enhancement information corresponding to a difference between pixel values of the one or more input digital frames and corresponding pixel values of up-sampled versions of the one or more base frames, the method comprising:
decoding the one or more encoded base frames in the set of base data with a decoder to generate the one or more base frames;
decoding the encoded enhancement information in the set of enhancement data with a decoder to generate the enhancement information;
reconstructing the input digital frames from the one or more base frames and the enhancement information with a decoder; and
displaying the input digital frames with a display or storing the input digital frames in a memory.

76. A method for decoding an input set of data containing one or more encoded digital frames including a set of base data containing one or more encoded base frames corresponding to one or more down-sampled input digital frames, wherein the one or more base frames are characterized by a lower resolution than the input digital frames and a set of enhancement data containing enhancement information corresponding to a difference between pixel values of the one or more input digital frames and corresponding pixel values of up-sampled versions of the one or more base frames, the method comprising:

decoding the set of base data with a decoder to generate the one or more base frames;

ignoring the set of enhancement data; and displaying the one or more base frames with a display or storing the one or more base frames in a memory.

77. A system, comprising:

a processor module;

a memory coupled to the processor, wherein the memory contains executable instructions configured to implement a method for decoding an input set of data containing one or more encoded digital frames including a set of base data containing one or more encoded base frames corresponding to one or more down-sampled input digital frames, wherein the one or more base frames are characterized by a lower resolution than the input digital frames and a set of enhancement data containing enhancement information corresponding to a difference between pixel values of the one or more input digital frames and corresponding pixel values of up-sampled versions of the one or more base frames, the method comprising:

decoding the set of base data with a decoder to generate the one or more base frames;

ignoring the set of enhancement data; and displaying the one or more base frames with a display or storing the one or more base frames in a memory.

78. A non-transitory computer readable medium having embodied therein computer readable instructions configured, to implement a method for decoding an input set of data containing one or more encoded digital frames including a set of base data containing one or more encoded base frames corresponding to one or more down-sampled input digital frames, wherein the one or more base frames are characterized by a lower resolution than the input digital frames and a set of enhancement data containing enhancement information corresponding to a difference between pixel values of the one or more input digital frames and corresponding pixel values of up-sampled versions of the one or more base frames, the method comprising:

decoding the set of base data with a decoder to generate the one or more base frames;

ignoring the set of enhancement data; and displaying the one or more base frames with a display or storing the one or more base frames in a memory.

* * * * *